US012789417B2

(12) United States Patent
Lewis et al.

(10) Patent No.: US 12,789,417 B2
(45) Date of Patent: Nov. 10, 2026

(54) STRETCHING DEVICES AND METHODS TO ALIGN EXTRACELLULAR MATRIX FIBERS

(71) Applicant: BOARD OF TRUSTEES OF THE UNIVERSITY OF ARKANSAS, Little Rock, AR (US)

(72) Inventors: Mackenzie Lewis, Fayetteville, AR (US); Gabriel David, Garfield, AR (US); Younghye Song, Fayetteville, AR (US)

(73) Assignee: Board of Trustees of the University of Arkansas, Little Rock, AR (US)

( * ) Notice: Subject to any disclaimer, the term of this patent is extended or adjusted under 35 U.S.C. 154(b) by 217 days.

(21) Appl. No.: 18/386,956

(22) Filed: Nov. 3, 2023

(65) Prior Publication Data

US 2024/0149497 A1 May 9, 2024

Related U.S. Application Data

(60) Provisional application No. 63/422,808, filed on Nov. 4, 2022.

(51) Int. Cl.
*B29C 33/20* (2006.01)
*B29C 33/22* (2006.01)
(Continued)

(52) U.S. Cl.
CPC ............ *B29C 33/202* (2013.01); *B29C 33/22* (2013.01); *B29C 33/308* (2013.01); *B29C 43/06* (2013.01);
(Continued)

(58) Field of Classification Search
CPC .... B29C 2043/3631; B29C 2043/5816; B29C 41/38; B29C 43/06; B29C 33/202;
(Continued)

(56) References Cited

U.S. PATENT DOCUMENTS 7,514,095 B2 4/2009 Nelson et al.
7,524,335 B2 4/2009 Slivka et al.
(Continued)

FOREIGN PATENT DOCUMENTS

CN 106323772 A * 1/2017 ............... G01N 3/32

OTHER PUBLICATIONS

English Translation of CN106323772 (Year: 2017).*
(Continued)

*Primary Examiner* — Emmanuel S Luk
*Assistant Examiner* — Victoria Bartlett
(74) *Attorney, Agent, or Firm* — Farhang Amini; Shackelford, McKinley & Norton, LLP

(57) ABSTRACT

Embodiments of the present disclosure pertain to a clamp assembly that includes: a first base and a second base; and a mold operational to be clamped between the first base and the second base. The clamp assembly is operational to stretch and compress the clamped mold without movement of the first base and the second base. For instance, each of the first base and the second base may include a plurality of apertures with pegs that are associated with the mold, where the pegs are operational for stretching and compressing the mold through adjustment. Further embodiments pertain to methods of moving a mold by utilizing the clamp assemblies of the present disclosure.

20 Claims, 19 Drawing Sheets

(51) Int. Cl.

| | |
|---|---|
| ***B29C 33/30*** | (2006.01) |
| ***B29C 33/38*** | (2006.01) |
| ***B29C 41/38*** | (2006.01) |
| ***B29C 43/06*** | (2006.01) |
| ***B29C 43/36*** | (2006.01) |
| ***B29C 43/58*** | (2006.01) |

(52) U.S. Cl.
CPC ........ *B29C 33/301* (2013.01); *B29C 33/3814* (2013.01); *B29C 41/38* (2013.01); *B29C 2043/3631* (2013.01); *B29C 2043/5816* (2013.01)

(58) Field of Classification Search
CPC ..... B29C 33/22; B29C 33/301; B29C 33/308; B29C 33/3814
See application file for complete search history.

(56) References Cited

U.S. PATENT DOCUMENTS

| | | | |
|---|---|---|---|
| 9,242,027 | B2 | 1/2016 | Bellan et al. |
| 9,700,653 | B2 | 7/2017 | Venkatraman et al. |
| 9,707,000 | B2 | 7/2017 | Ahmet et al. |
| 9,902,932 | B2 | 2/2018 | Nain et al. |
| 10,716,876 | B2 | 7/2020 | Shoseyov et al. |
| 10,940,235 | B2 | 3/2021 | Kohn et al. |
| 11,285,244 | B2 | 3/2022 | Hoerstrup et al. |
| 11,318,227 | B2 | 5/2022 | Francis et al. |
| 2008/0220042 | A1 | 9/2008 | Hashi et al. |
| 2009/0248145 | A1 | 10/2009 | Chan et al. |
| 2012/0040461 | A1 | 2/2012 | Beachley et al. |
| 2012/0273993 | A1 | 11/2012 | Shoseyov et al. |
| 2013/0309295 | A1 | 11/2013 | Gatenholm et al. |
| 2015/0073551 | A1 | 3/2015 | Uehlin et al. |
| 2016/0325013 | A1 | 11/2016 | Li et al. |
| 2018/0257270 | A1* | 9/2018 | Endoh ..................... B29C 39/38 |
| 2019/0070339 | A1 | 3/2019 | Gerecht et al. |
| 2019/0390152 | A1* | 12/2019 | Li .......................... C12M 41/48 |
| 2020/0376170 | A1 | 12/2020 | Ahn et al. |

OTHER PUBLICATIONS

McCoy MG, Wei JM, Choi S, Goerger JP, Zipfel W, Fischbach C. Collagen Fiber Orientation Regulates 3D Vascular Network Formation and Alignment. ACS Biomater Sci Eng. Aug. 13, 2018;4(8):2967-2976. doi: 10.1021/acsbiomaterials.8b00384. Epub Jul. 11, 2018. PMID: 33435017.

Lacko CS, Singh I, Wall MA, Garcia AR, Porvasnik SL, Rinaldi C, Schmidt CE. Magnetic particle templating of hydrogels: engineering naturally derived hydrogel scaffolds with 3D aligned microarchitecture for nerve repair. J Neural Eng. Feb. 12, 2020;17(1):016057. doi: 10.1088/1741-2552/ab4a22. PMID: 31577998; PMCID: PMC7687284.

Mredha MTI, Guo YZ, Nonoyama T, Nakajima T, Kurokawa T, Gong JP. A Facile Method to Fabricate Anisotropic Hydrogels with Perfectly Aligned Hierarchical Fibrous Structures. Adv Mater. Mar. 2018;30(9). doi: 10.1002/adma.201704937. Epub Jan. 17, 2018. PMID: 29341264.

Ravishankar P, Tandon I, Balachandran K. Effect of Cyclic Uniaxial Mechanical Strain on Endothelial Progenitor Cell Differentiation. Cardiovasc Eng Technol. Dec. 2022; 13(6):872-885. doi: 10.1007/s13239-022-00623-5. Epub May 2, 2022. PMID: 35501625.

S.H. Kim, et al., Anisotropically organized three-dimensional culture platform for reconstruction of a hippocampal neural network, Nat. Commun. 8 (2017), 14346.

Seo BR, Chen X, Ling L, Song YH, Shimpi AA, Choi S, Gonzalez J, Sapudom J, Wang K, Andresen Eguiluz RC, Gourdon D, Shenoy VB, Fischbach C. Collagen microarchitecture mechanically controls myofibroblast differentiation. Proc Natl Acad Sci U S A. May 26, 2020;117(21):11387-11398. doi: 10.1073/pnas.1919394117. Epub May 8, 2020. PMID: 32385149; PMCID: PMC7260976.

* cited by examiner

Collagen Fiber Alignment

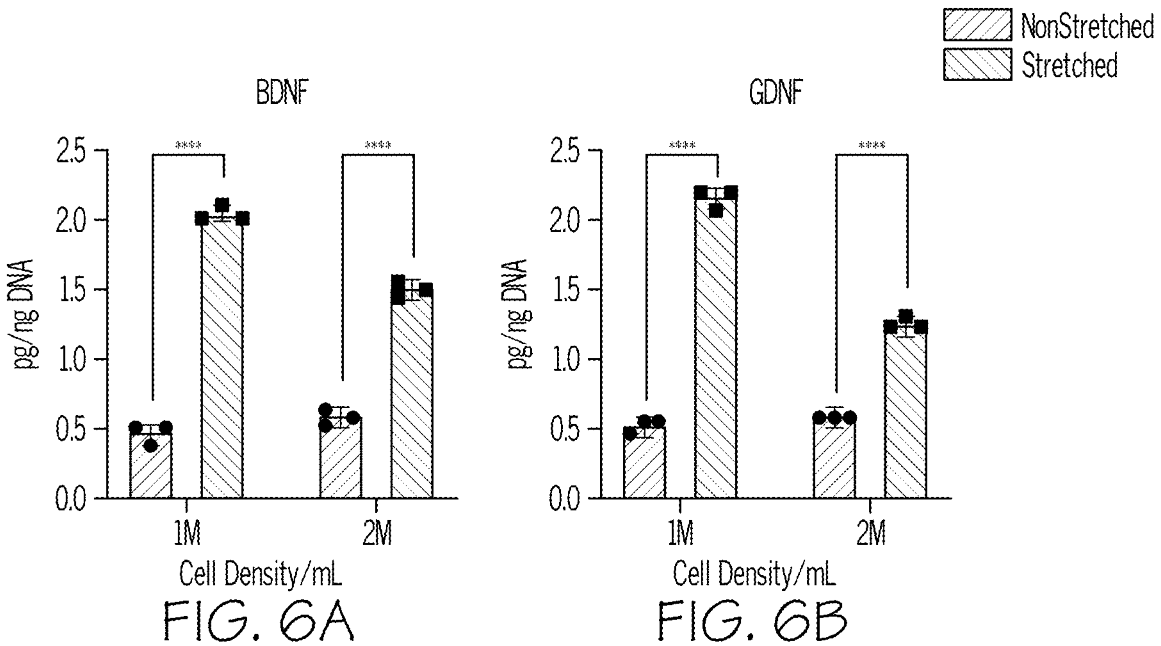
FIG. 6A
FIG. 6B
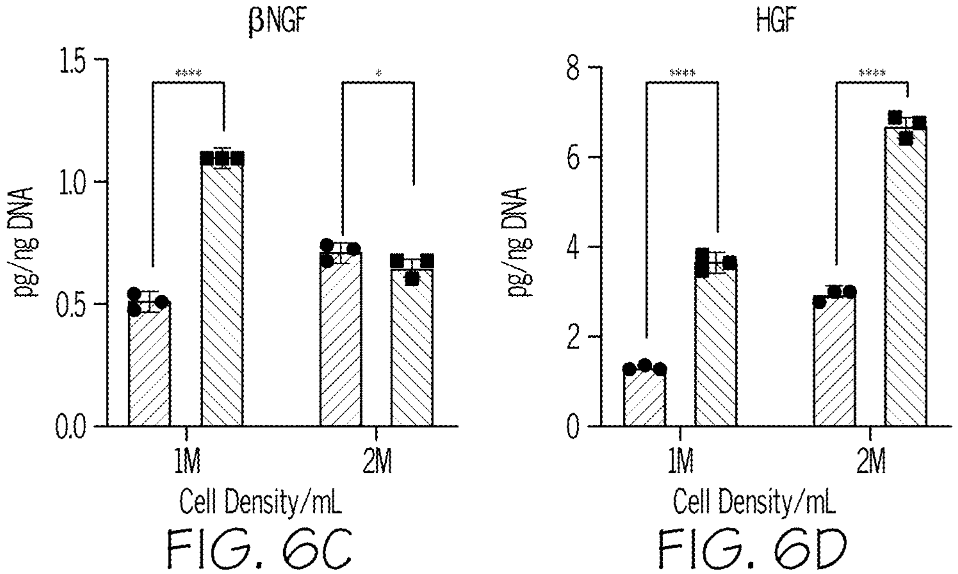
FIG. 6C
FIG. 6D

STRETCHING DEVICES AND METHODS TO ALIGN EXTRACELLULAR MATRIX FIBERS

CROSS-REFERENCE TO RELATED APPLICATIONS

This application claims priority to U.S. Provisional Patent Application No. 63/422,808, filed on Nov. 4, 2022. The entirety of the aforementioned application is incorporated herein by reference.

BACKGROUND

A need exists for improved devices capable of modifying fibers. Numerous embodiments of the present disclosure aim to address the aforementioned need.

SUMMARY

In some embodiments, the present disclosure pertains to a clamp assembly that includes a first base and a second base. In some embodiments, the clamp assembly also includes a mold that is operational to be clamped between the first base and the second base. In some embodiments, the clamp assembly is operational to stretch and compress the clamped mold without movement of the first base and the second base. In some embodiments, the clamp assembly is operational to stretch and compress the clamped mold without biaxial movement of the first base and the second base. In some embodiments, the clamp assembly is operational to stretch and compress the clamped mold through uniaxial movement of the clamped mold.

In some embodiments, each of the first base and the second base includes a plurality of apertures that interface with the mold. In some embodiments, each of the plurality of apertures includes at least one peg associated with the mold. In some embodiments, the pegs are operational for stretching and compressing the mold through adjustment of the pegs. In some embodiments, the pegs are operational for providing different degrees of stretching and compressing through the differential adjustment of the pegs.

Further embodiments of the present disclosure pertain to methods of moving a mold. In some embodiments, such methods include clamping the mold between a first base and a second base of a clamp assembly and then moving the clamped mold.

In some embodiments, the methods of the present disclosure include stretching a clamped mold on a clamp assembly of the present disclosure such the stretching occurs without movement of the first base and the second base; placing a precursor solution of the present disclosure on the clamped and stretched mold; curing the precursor solution on the clamped and stretched mold; and compressing the clamped mold after the curing step to result in compression of the resulting product.

DESCRIPTION OF THE DRAWINGS

FIG. 2A shows the components of the stretching device, including an acrylic base, steel clamps, and silicone molds. Scale bar=100 mm. FIG. 2B is a schematic showing the relaxation of the pre-stretched molds leading to aligned fibers. FIG. 2C shows a silicone mold and gels in petri dish with media. FIG. 2D shows a cross-section of a silicone mold. FIG. 2E shows a hydrogel creation process. FIG. 2F provides depictions of plasma cleaner sterilization and sealing methods.

FIG. 3A shows QPLI microscope images depicting fiber orientation in scaffolds after 1 day of culture, where red is vertical fibers and cyan is horizontal fibers. Scale bar=5 mm. FIG. 3B shows confocal reflectance images visualizing collagen I fibers in acellular hydrogels after 2 days of culture. Scale bar=100 μm. FIG. 3C is a graph showing the directional variance of samples with and without stretching. Analysis performed with multiple t-tests, $*p<0.05$ for n=4/group. FIG. 3D is a graph showing the coherence (uniformity) for each sample group. Analysis performed with multiple t-tests, $*p<0.05$, $****p<0.001$ for n=12/group.

FIG. 4A shows images of cells in the bulk of the hydrogel after 1 week of culture, stained with phalloidin (red) to visualize f-actin and the cell body and with DAPI (blue) to visualize cell nuclei. Scale bar=100 μm. FIGS. 4B-4C show graphs depicting the coherence (alignment) of actin fibers within 3 mg/mL (FIG. 4B) and 6 mg/mL (FIG. 4C) samples. FIG. 4D is a graph showing the coherence of actin fibers within stretched scaffolds for 3 and 6 mg/mL and 1 and 2 M/mL. Analysis performed with multiple t-tests. $****p<0.0001$ for n=12/group.

FIG. 5A shows images showing live (green) and dead (red) cells within the scaffolds after 1 week of culture. Scale bar=100 μm. FIG. 5B shows a graph showing the percentage of live and dead cells within the scaffolds. Analysis was performed with a one-way ANOVA and post-hoc Tukey's test. FIG. 5C is a graph showing the percentage of live and dead cells in all 3 and 6 mg/mL samples. Analysis performed with t-test. $****p<0.0001$ for n=28-34/group. FIGS. 5D-5E are graphs showing the percentage of live and dead cells in 3 mg/mL samples, comparing non-stretched (NS) (FIG. 5D) and stretched (S) samples (FIG. 5E), and 1 and 2 M/mL samples. Analysis performed with t-test. ns=no significance.

FIGS. 6A-6G show graphs depicting results from Luminex analysis normalized to DNA content performed on conditioned media from 3 mg/mL scaffolds over 24 h after 1 week of culture. FIGS. 6A-6C show results related to neurotrophin content, including brain derived neurotrophic factor (BDNF) (FIG. 6A), glial derived neurotrophic factor (GDNF) (FIG. 6B), and beta nerve growth factor (βNGF) (FIG. 6C). FIGS. 6D-6G show results related to angiogenic factors, including hepatocyte growth factor (HGF) (FIG. 6D), Interleukin 8 (IL-8) (FIG. 6E), Angiopoietin-1 (FIG. 6F), and Fibroblast growth factor (FGF-2) (FIG. 6G). Analysis performed with multiple t-tests. $*p<0.05$, $*p<0.001$, $**p<0.0001$ for n=3/group.

FIG. 7A shows immunofluorescence images depicting f-actin (red), fibronectin (green), laminin (blue), and DAPI (cyan) in 3 mg/mL scaffolds after 1 week of culture. Scale bar=100 μm. FIG. 7B shows intensity normalized to cell count of fibronectin. FIG. 7C shows coherence (alignment) of fibronectin in scaffolds. FIG. 7D shows intensity normalized to cell count of laminin. FIG. 7E shows coherence of laminin in scaffolds. Intensity analysis performed with one-way ANOVA with post-hoc Tukey's test. Orientation analysis performed with multiple t-tests. $*p<0.05$, $p<0.01$, $*p<0.001$, $****p<0.0001$ for n=12/group.

FIG. 8A shows images visualizing YAP (red) in 3 mg/mL 1 M/mL scaffolds after 1 week of culture. Scale bar=100 μm. FIG. 8B shows nuclear intensity of YAP staining in scaffolds. FIG. 8C shows Nuclear:cytoplasmic staining ratio for YAP. Analysis performed with t-tests. $*p<0.05$ for n=12/group.

FIGS. 9A-9B show images of the compression testing setup. FIG. 9C shows a graph visualizing Young's modulus values for 3 mg/mL samples. The yellow shaded area represents 1-10 kPa and the red dashed line represents 7.5 kPa target values. All groups are significantly different at $****p<0.0001$ for n=22-30/group. Analysis performed with one-way ANOVA and post-hoc Tukey's test.

FIG. 10A shows immunofluorescent images of neurite outgrowth after 48 h of co-culture on 3 mg/mL scaffolds visualizing neurofilament (red) and f-actin within cells (green). Scale bar=500 μm. FIG. 10B shows neurite orientation in 3 mg/mL 1 M/mL scaffolds, with values binned every 10°. FIGS. 10C-10E show neurite count over a certain distance: 100-1400 μm (FIG. 10C), 500 μm (FIG. 10D), and 1400 μm (FIG. 10E). Analysis for FIG. 10C was performed with three-way ANOVA. Analysis for FIGS. 10D-10E were performed with two-way ANOVA and post-hoc Tukey's test. $*p<0.05$ for n=4/group.

DETAILED DESCRIPTION

Figure 1A:
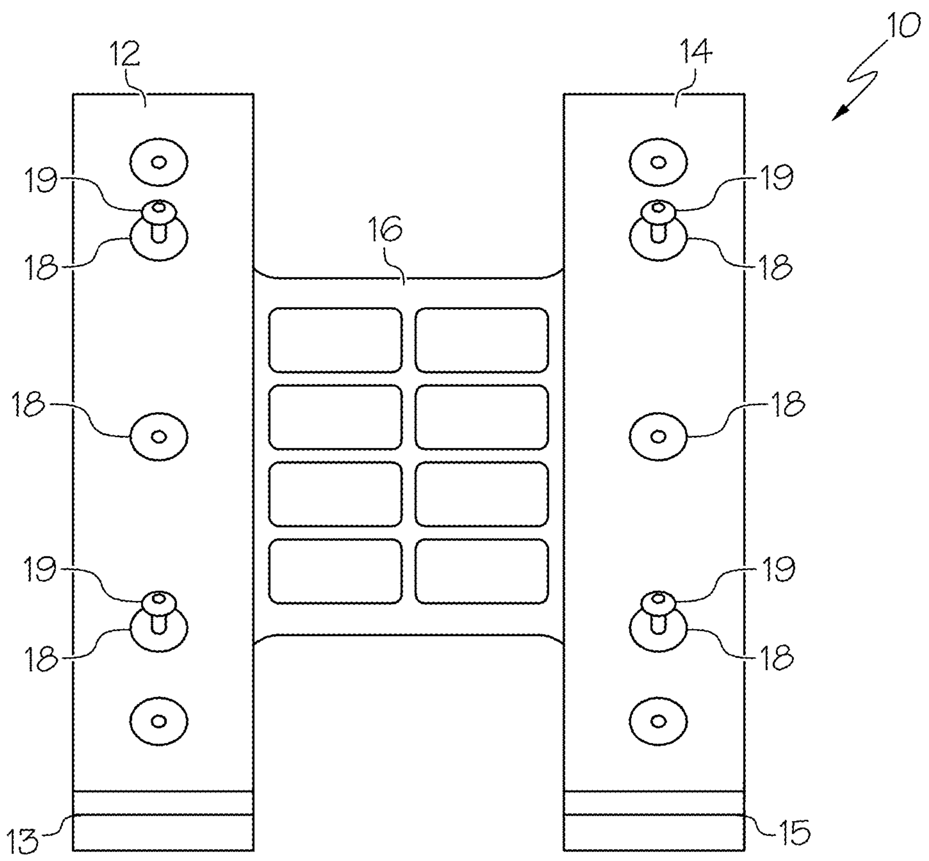
FIGS. 1A-1B depict planar (FIG. 1A) and cross-sectional (FIG. 1B) views of a clamp assembly in accordance with various embodiments of the present disclosure.

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components that includes one unit and elements or components that include more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Aligned fibers can be created via different methods, such as electrospinning, photo-crosslinking, and/or cyclic stretching. However, there are limitations to using these methods, such as high voltage and residual toxicity, which can reduce the degradability of fibers and increase toxicity. Moreover, many methods of forming aligned fibers utilize sophisticated equipment, such as biaxial stretchers.

For instance, aligned extracellular matrix (ECM) fibers mimic native nerve tissue architecture and would facilitate axonal regeneration after injury. In fact, peripheral nerve injury (PNI) remains a significant clinical challenge, with an average incidence of between 43 and 52 per one million people affected annually in the US alone. While surgical coaptation of the severed ends of the nerves is possible in short- or no-gap injuries, long-gap injuries (20 mm or greater) require implantation of nerve repair grafts, including autografts, to avoid exerting excess tension on the remaining nerves and causing further damage.

Nerve repair grafts are preferred over autografts to avoid additional surgery and corresponding sites of morbidity. Current nerve repair implant strategies in the clinic are hollow nerve guidance conduits (NGCs) and decellularized nerve grafts. While these strategies have been used to treat patients with nerve injuries, they do not provide universal solutions to nerve repair.

Hollow NGCs are effective for short nerve gaps (less than 5 mm). On the other hand, decellularized nerve grafts have shown clinical success in longer gap repairs (up to 70 mm) because of the preservation of intraluminal basal lamina architecture. Nevertheless, decellularized nerve grafts possess a few limitations, including but not limited to 1) inability to tailor graft dimensions to individual patients, and 2) a need for migration of Schwann cells to facilitate axonal regeneration and axon myelination.

Aligned ECM fibers, particularly collagen, have been shown to enhance nerve repair potentials. This has been demonstrated in not only engineered nerve repair grafts with aligned features, but also tissues such as tendons and muscles that contain aligned collagen fibers.

As such, there exist many different approaches to create aligned structures, including but not limited to uniaxial strain; extracting longitudinal collagen fibers from inherently anisotropic tissues; extruding precursor solutions to induce alignment of polymer fibers; and creating aligned patterns via alignment of dissolvable magnetic beads. Among these different approaches, applying uniaxial strain to collagen pre-gel solutions offers the most simplistic approach to align both collagen fibers and encapsulated cells throughout an entire three-dimensional (3D) hydrogel.

Research into recellularization of acellular nerve grafts has been conducted using Schwann cells or mesenchymal stem cells (MSCs) from bone marrow (bMSCs) or adipose (ASCs), either undifferentiated or as Schwann-like cells, with abluminal coverage or endoneurial delivery using microinjectors. While a direct injection of Schwann cells is beneficial, clinical translation of Schwann cell transplantation remains challenging because of the inherently low yield of autologous Schwann cells. While previous studies collectively show therapeutic benefits of MSC delivery in nerve-mimetic grafts, there still exists a need to develop grafts that allow an even distribution of MSCs across the graft containing basal lamina-like topographical features.

Microinjections of MSCs at four or more sites along the length of the grafts have been widely used. However, this approach relies on migration of injected cells for homogeneous distribution across the entire length of the nerves. Further, while ASCs share many similarities with bMSCs, one key advantage of ASCs over bMSCs is their abundance and ease of isolation from stromal vascular fraction of adipose tissue, whereas harvesting bMSCs is a painful process yielding low cell counts.

Previous research suggests alignment of fibers could specifically enhance neuro-regenerative properties. For instance, aligned fibers doped with collagen or growth factors have been shown to promote neurite outgrowth. Further, Schwann cells and neurons embedded in hydrogels with aligned fibers exhibited increased neuro-regenerative potential. Aligned fibers have also been shown to guide other tissue-reparative cells such as endothelial cells and macrophages to promote nerve repair activities of Schwann cells. Aligned fibers also accelerate neurogenic differentiation of stem cells including MSCs.

The aforementioned studies collectively demonstrate neuro-regenerative benefits of aligned fibers. However, a need exists for improved devices capable of modifying fibers, such as ECMs. Numerous embodiments of the present disclosure aim to address the aforementioned need.

Clamp Assemblies

In some embodiments, the present disclosure pertains to a clamp assembly that includes a first base and a second base. In some embodiments, the clamp assembly also includes a mold that is operational to be clamped between the first base and the second base. In some embodiments, the clamp assembly is operational to stretch and compress the clamped mold without movement of the first base and the second base. In some embodiments, the clamp assembly is operational to stretch and compress the clamped mold without biaxial movement of the first base and the second base. In some embodiments, the clamp assembly is operational to stretch and compress the clamped mold through uniaxial movement of the clamped mold.

In some embodiments, at least one of the first base and the second base includes at least one aperture that includes at least one peg. In some embodiments, the mold is associated with the peg. In some embodiments, the peg is operational for stretching and compressing the mold through adjustment of the peg.

In some embodiments, each of the first base and the second base includes at least one aperture that includes at least one peg associated with the mold. In some embodiments, the peg is operational for stretching and compressing the mold through adjustment of the peg.

In some embodiments, each of the first base and the second base includes a plurality of apertures that interface with the mold. In some embodiments, each of the plurality of apertures includes at least one peg associated with the mold. In some embodiments, the pegs are operational for stretching and compressing the mold through adjustment of the pegs. In some embodiments, the pegs are operational for providing different degrees of stretching and compressing through the differential adjustment of the pegs.

The clamp assemblies of the present disclosure can include various pegs. For instance, in some embodiments, the pegs include screws. In some embodiments, the pegs include levers.

The clamp assemblies of the present disclosure may also utilize various molds. For instance, in some embodiments, the molds include silicone-based molds. In some embodiments, the silicone-based molds include a polymer, such as polydimethylsiloxane. In some embodiments, the molds include hydrogels.

The clamp assemblies of the present disclosure may include various first and second bases. For instance, in some embodiments, at least one of the first and second bases includes an acrylic base. In some embodiments, at least one of the first and second bases includes a steel base.

Figure 1B:
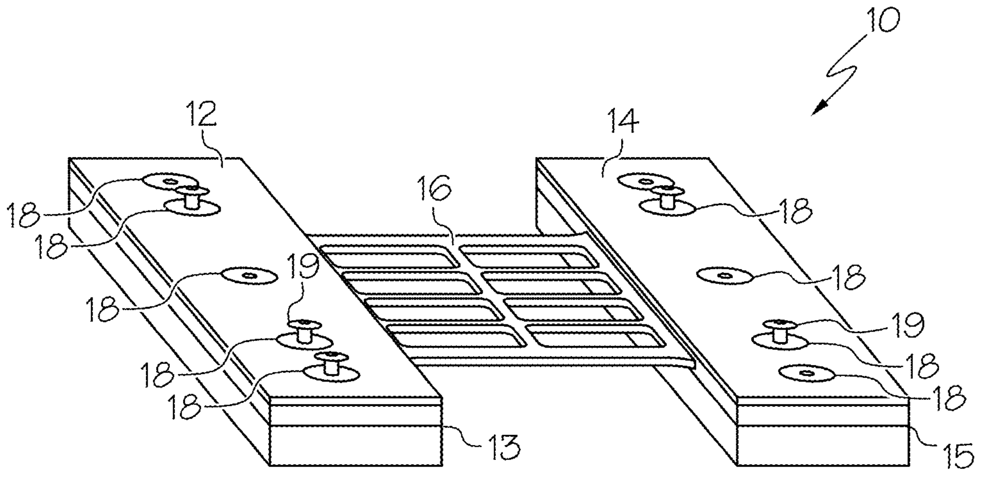

The clamp assemblies of the present disclosure can have various structures and arrangements. For instance, in some embodiments illustrated in FIGS. 1A-1B, the clamp assemblies of the present disclosure include clamp assembly 10, which includes a first base 12, a second base 14, and a mold 16 clamped between the first base 12 and the second base 14.

Each of the first base 12 and second base 14 includes opening 13 and 15, respectively. Openings 13 and 15 are each operational to receive mold 16.

Each of the first base 12 and second base 14 also includes a plurality of apertures 18 operational to interface with mold 16. Furthermore, apertures 18 include pegs 19 that are associated with mold 16.

Methods of Moving a Mold

Further embodiments of the present disclosure pertain to methods of moving a mold. In some embodiments, such methods include clamping the mold between a first base and a second base of a clamp assembly and then moving the clamped mold. In some embodiments, the clamp assembly is operational to stretch and compress the clamped mold without movement of the first base and the second base. In some embodiments, the movement occurs without moving the first base and the second base of the mold. In some embodiments, the methods of the present disclosure also include a step of removing the mold from the first base and the second base. In some embodiments, the removing results in compression of the mold.

The methods of the present disclosure may utilize various types of clamp assemblies. For instance, in some embodiments, the clamp assembly includes a clamp assembly of the present disclosure. Such clamp assemblies were described supra and incorporated herein by reference. For instance, in some embodiments, the clamp assembly includes clamp assembly 10 described in FIGS. 1A-1B. In operation, mold 16 may be placed in openings 13 and 15 of first base 12 and second base 14. Pegs 19 are then placed within apertures 18 of first base 12 and second base 14. Thereafter, pegs 19 may be adjusted to result in the stretching and/or compressing of mold 16 without movement of first base 12 and second base 14. In some embodiments, the differential adjustment of pegs 19 provide different degrees of stretching and compressing.

The methods of the present disclosure may be utilized to move molds in various manners. For instance, in some embodiments, mold movement includes stretching, compressing, or combinations thereof. In some embodiments, the mold movement includes stretching. In some embodiments, mold movement includes compressing. In some embodiments, mold movement includes stretching or compressing the clamped mold without biaxial movement of the first base and the second base. In some embodiments, mold movement includes uniaxial stretching of the clamped mold. In some embodiments, mold movement includes uniaxial compression of the clamped mold.

In some embodiments where at least one of the first base and the second base of a clamp assembly includes at least one aperture with one or more pegs associated with the mold, mold movement includes adjustment of the one or more pegs. In some embodiments where each of the first base and the second base includes a plurality of apertures with pegs associated with the mold, mold movement includes adjustment of the pegs. In some embodiments, mold movement includes different degrees of stretching and compressing through the differential adjustment of the pegs. In some embodiments, differential adjustment of the pegs provides different degrees of stretching, compressing, or combinations thereof.

In some embodiments, the methods of the present disclosure also include a step of placing a precursor solution on a mold. In some embodiments, the precursor solution is placed on the mold before, during or after mold movement. In some embodiments, the precursor solution is placed on the mold before stretching the mold. In some embodiments, the stretching of the mold can also result in the stretching of the precursor solution.

In some embodiments, the precursor solution includes a pre-gel solution. In some embodiments, the precursor solution includes a hydrogel precursor solution. In some embodiments, the precursor solution includes an extracellular matrix precursor solution. In some embodiments, the precursor solution does not include cells. In some embodiments, the precursor solution includes cells. In some embodiments, the cells include stem cells. In some embodiments, the cells include primary cells or cell lines. In some embodiments, the cells include adipose-derived mesenchymal stem cells (ASCs).

In some embodiments, the methods of the present disclosure also include a step of mixing cells with a precursor solution and then placing the cell-containing precursor solution on the mold. In some embodiments, the cell-containing precursor solution is placed on the mold before, during or after the mold movement. In some embodiments, the cell-containing a precursor solution is placed on the mold after stretching the mold.

In some embodiments, the methods of the present disclosure also include a step of growing the cells in the precursor solution. In some embodiments, the cells are grown on the mold before, during or after the mold movement. In some embodiments, the cells are grown on the mold after stretching the mold.

Figure 1C:
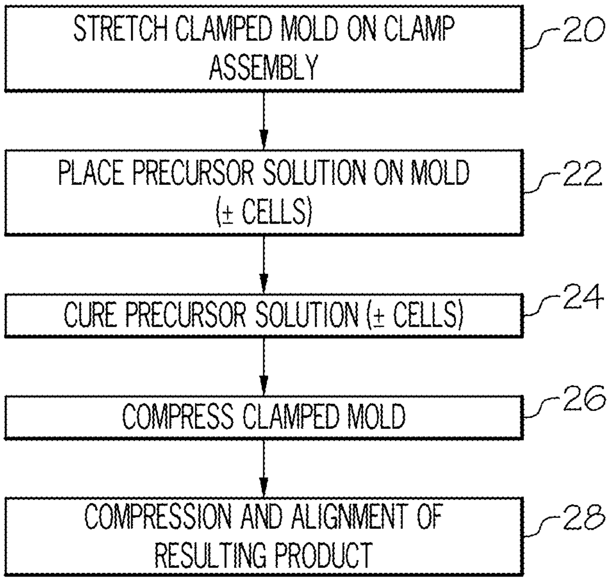
FIG. 1C illustrates a method of using a clamp assembly in accordance with various embodiments of the present disclosure.

The methods of the present disclosure can have various embodiments. For instance, in some embodiments illustrated in FIG. 1C, the methods of the present disclosure include stretching a clamped mold on a clamp assembly of the present disclosure such the stretching occurs without movement of the first base and the second base (step 20); placing a precursor solution of the present disclosure on the clamped and stretched mold (e.g., precursor solutions with or without cells) (step 22); curing the precursor solution on the clamped and stretched mold (step 24); and compressing the clamped mold after the curing step (step 26), thereby resulting in compression of the resulting product (step 28).

The methods of the present disclosure may cure precursor solutions on molds in various manners. For instance, in some embodiments, the curing includes incubating the precursor solution with the clamped and stretched mold. In some embodiments, the incubation occurs at a temperature ranging from about 30° C. to about 40° C. In some embodiments, the incubation occurs at a temperature of about 37° C.

In some embodiments, the incubation occurs at a temperature below room temperature. In some embodiments, the incubation occurs at a temperature of about 4° C. In some embodiments, the incubation temperature may be adjusted to control the thickness of the resulting product. For instance, in some embodiments, lower temperatures (e.g., temperatures of about 4° C.) yield thicker products while higher temperatures (e.g., temperatures of about 37° C.) yield thinner products.

The methods of the present disclosure may also utilize various methods to compress clamped and stretched molds. For instance, in some embodiments, the compression includes removing the clamped and stretched mold from the first base and the second base of the clamp assembly. In some embodiments, the removing results in compression of the resulting product. In some embodiments, the compression includes adjusting one or more pegs associated with the clamp assembly.

Applications and Advantages

The methods and clamp assemblies of the present disclosure can have various advantages. For instance, in some embodiments, the methods and clamp assemblies of the present disclosure may be utilized without the use of electrospinning, photo-crosslinking, cyclic stretching, and/or biaxial stretching.

The methods and clamp assemblies of the present disclosure can have various applications. For instance, in some embodiments, the methods and clamp assemblies of the present disclosure may be used to form aligned fibers on the mold. In some embodiments, the methods and clamp assemblies of the present disclosure may be used to grow aligned cells along the aligned fibers of the mold.

In some embodiments, the methods and clamp assemblies of the present disclosure may be utilized to form an extracellular matrix-based construct. In some embodiments, the extracellular matrix includes collagen. In some embodiments, the extracellular matrix includes aligned collagen fibers.

In some embodiments, the methods and clamp assemblies of the present disclosure may be utilized to form a tissue. In some embodiments, the tissue includes a nerve tissue, a muscle tissue, a cardiac tissue, bone tissue, skin tissue, tendon tissue, or combinations thereof. In some embodiments, the tissue is utilized as a tissue repair graft. In some embodiments, the tissue is utilized as a peripheral and central nerve repair graft. In some embodiments, the tissue is utilized as a mimic of diseased or injured tissues, including fibrotic tissues.

In some embodiments, the methods and clamp assemblies of the present disclosure may be utilized to form drug delivery molds. In some embodiments, the methods and clamp assemblies of the present disclosure may be utilized to form a fabric, such as leather. In some embodiments, the methods and clamp assemblies of the present disclosure may be utilized to form engineered meat.

ADDITIONAL EMBODIMENTS

Reference will now be made to more specific embodiments of the present disclosure and experimental results that provide support for such embodiments. However, Applicant notes that the disclosure below is for illustrative purposes only and is not intended to limit the scope of the claimed subject matter in any way.

Example 1. Neuro-Regenerative Behavior of Adipose-Derived Stem Cells in Aligned Collagen I Hydrogels In this Example, Applicant utilized a custom device to fabricate collagen I hydrogels with aligned fibers and encapsulated adipose-derived mesenchymal stem cells (ASCs) for potential use as a peripheral nerve repair graft. Initial results of the scaffold system revealed significantly less cell viability in higher collagen gel concentrations; 3 mg/mL gels showed 84.8±7.3% viable cells, compared to 6 mg/mL gels viability of 76.7±9.5%. Mechanical testing of the 3 mg/mL gels showed a Young's modulus of 6.5±0.8 kPa nearly matching 7.45 kPa known to support Schwann cell migration. Further analysis of scaffolds coupled with stretching in vitro revealed heightened angiogenic and factor secretion, ECM deposition, fiber alignment, and dorsal root ganglia (DRG) neurite outgrowth along the axis of fiber alignment. Applicant's platform serves as an in vitro testbed to assess neuro-regenerative potential of ASCs in aligned collagen fiber scaffolds.

In this Example, Applicant explored neuro-regenerative behavior of ASCs in 3D hydrogels containing uniaxially aligned collagen fibers. To analyze the neuro-regenerative behavior of ASC-encapsulated hydrogels coupled with uniaxial strain, advanced culture systems were developed. To create aligned collagen fiber scaffolds, human ASCs were seeded into collagen I pregel solution, which was cast into a uniaxially stretched silicone mold. Thermally gelled 3D hydrogel scaffolds were cultured for 7 days before analysis was performed. Applicant show directional alignment of ASCs with collagen fibers in stretched gels, and concomitant increase in neuro-regenerative ECM and cytokine deposition.

Dorsal root ganglia (DRGs) were seeded onto gels after the 7-day culture period with ASCs to analyze neurite outgrowth. Overall, Applicant's study provides insight into neuro-regenerative behavior of ASCs in 3D aligned collagen I fiber scaffolds

Example 1.1. Collagen I Pregel Formation

Collagen I was isolated from frozen rat tails based on a previously established method. Skin was first removed from the tail, and each vertebra was pulled to isolate the tendons. The isolated tendons were digested in 0.1% acetic acid (Millipore Sigma 1000631000) at 75 mL/g for 3 days at 4° C. The collagen digest was centrifuged in 40 mL volumes for 90 min at 8800 rpm and 4° C. The supernatant was frozen for at least 24 h before being lyophilized for 4 days. The resulting collagen I was digested in 0.1% acetic acid at a concentration of 10 mg/mL to create the pregel solution. When used in hydrogel fabrication, 10% (v/v) 10× M199 (Sigma Aldrich M0650) were added to an aliquot of the pregel, followed by neutralization with 1M NaOH (Sigma Aldrich 415413). Phosphate buffered saline (PBS, VWR 97062) or cell suspension was then added to dilute to the working concentration for each sample. These pregels were then incubated at 37° C. to induce thermal gelation within their molds.

Example 1.2. hASC Culture

Human adipose-derived stem cells (hASCs, Lonza PT-5006) were cultured in ADSC Growth Medium Bulletkit (Lonza PT-3273 & PT-4503) containing 10% fetal bovine serum (FBS), 1% L-Glutamine, and 0.1% Gentamicin Sulfate-Amphotericin (GA-1000). All cultures were maintained at 5% $CO_2$ and 37° C. with media changes every 2-3 days. Cell passage p4-p5 were used for all cultures.

Example 1.3. Aligned Gels with ASCs

Figure 2A:
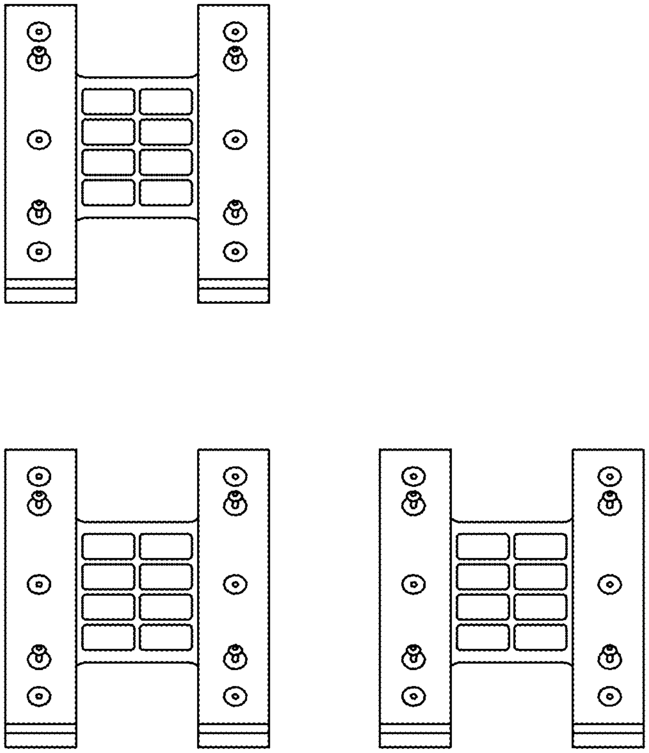
FIGS. 2A-2F illustrate a stretching device and its use.
Figure 2B:
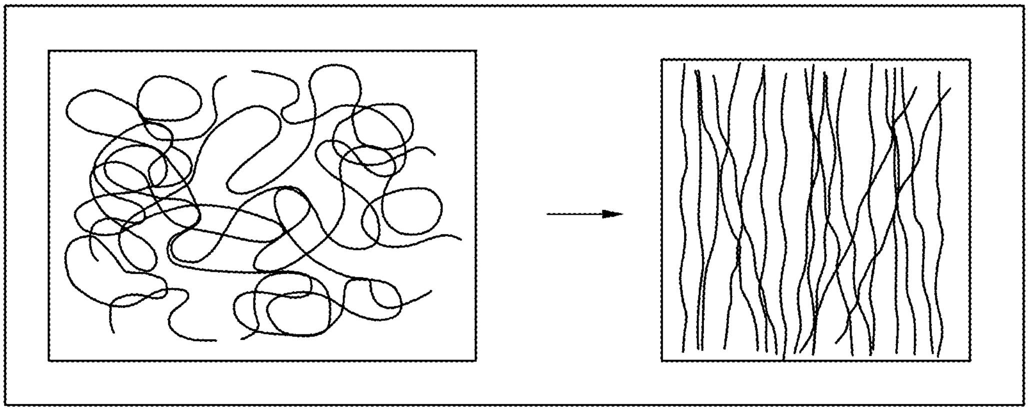
Figure 2C:
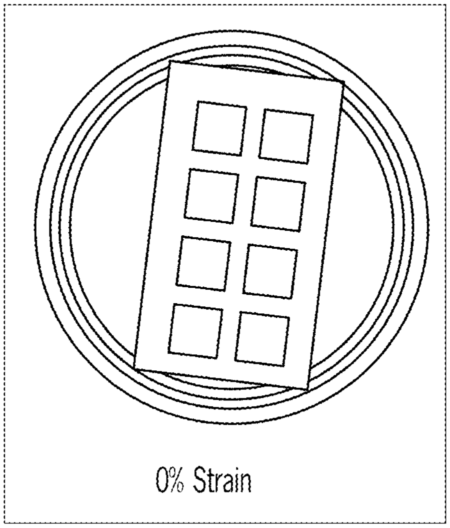
Figure 2D:
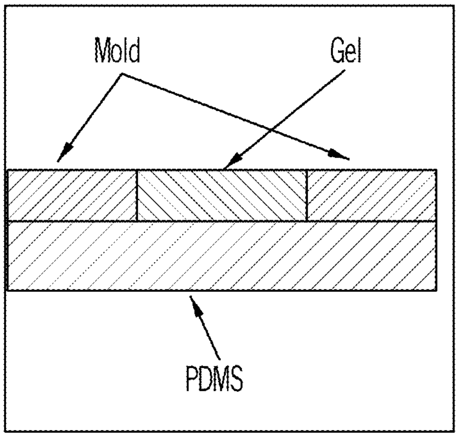
Figure 2E:
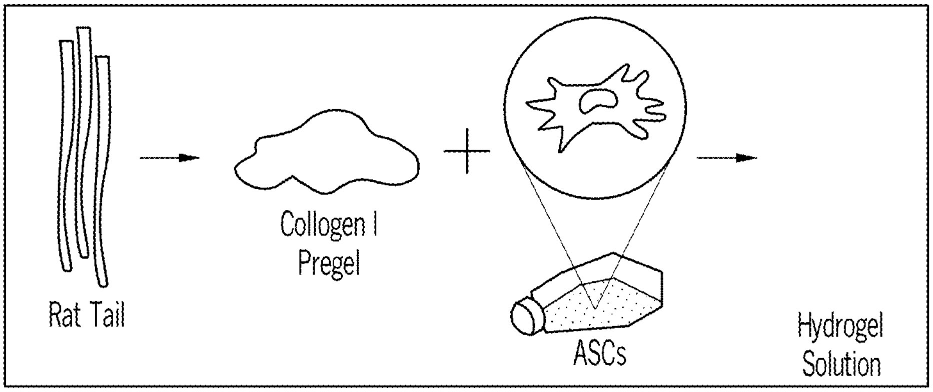
Figure 2F:
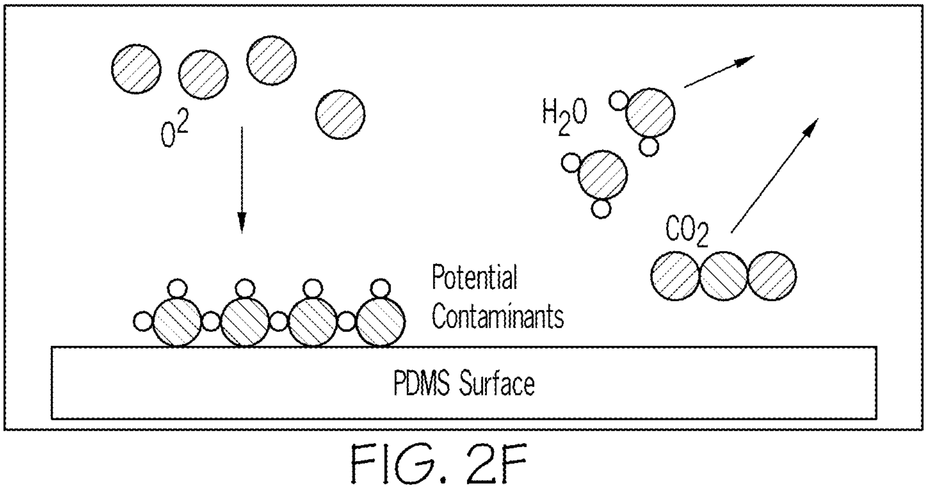

A custom stretching device was designed in SolidWorks and created with acrylic and steel (FIG. 2A). PDMS sheets (SMI 0.010" NRV G/G 40D 12"×12") were cut to the size of the silicone molds (Sigma Aldrich GBL664515) and plasma sealed using air plasma cleaner (Harrick Plasma) for >5 min (FIG. 2F). The PDMS-backed molds were clamped on both sides and placed on to the stretching device. The molds were then chemically functionalized to anchor collagen gels using a previously established method. Briefly, each well was filled with a 1% (v/v) solution of poly (ethyleneimine) (PEI, Sigma-Aldrich 181978) in $ddH_2O$ for 10 min, 0.1% (v/v) glutaraldehyde (Sigma-Aldrich G6257) in $ddH_20$ for 30 min, then rinsed twice with $ddH_2O$. The cell and pregel solution were then added to fill each well.

The device and molds were incubated for 45 min at 37° C. to induce collagen gelation. The molds were removed from the stretching device and clamps and placed in small petri dishes 60 mm in diameter with 8 mL of hASC media to incubate for 7 days at 37° C. and 5% $CO_2$ with media changes every 48 h. After plasma cleaning, all steps were performed aseptically in a cell culture hood.

Example 1.4. Quantitative Polarized Light Imaging (QPLI)

Quantitative Polarized Light Imaging (QPLI) was performed on a previously established QPLI microscope. Briefly, circularly polarized light is transmitted through a rotating linear polarizer driven by a stepper motor to generate linearly polarized light. The light is then focused with a condenser lens, transmitted through the sample, and collected with a 4× (0.13 NA) objective. Using a fixed circular analyzer and camera after the objective, 10 images (2056×2056 pixels, 1.4 μm/pixel) were collected in 18. increments of the rotating linear polarizer, and the oscillation in intensity at each pixel was used to calculate a pixelwise fiber orientation and phase retardation.

For this Example, acellular stretched (S) and nonstretched (NS) gels with four different collagen I concentrations were placed on a microscope slide, covered with a coverslip, and imaged on the system. Due to the size of the gels, multiple images were collected and stitched together to create a full field of view for each gel, resulting in complete maps of fiber orientation and phase retardation. Following stitching of the images, masks were then generated by outlining the gel in the stitched image, and then applying a phase retardation threshold of 1°. To quantify fiber organization, an overall directional variance value, which is a measure of fiber organization ranging between 0 (anisotropic) and 1 (isotropic), was calculated from all fiber orientations within the generated mask.

Example 1.5. Confocal Reflectance Microscopy

Acellular stretched and non-stretched hydrogels in 3 mg/mL and 6 mg/mL concentrations were created and fixed in 3.7% formaldehyde (Sigma-Aldrich 252549) in PBS at room temperature for 1 h. The gels were then rinsed and stored in PBS until imaging at 640 nm with an Olympus IX83 confocal microscope (20× objective magnification, 1.8× digital zoom, NA 0.80) with a Z-step of 2 μm, starting from the 'top' surface and extending into the gel 250 slices or 500 μm. The resulting Z-stack was analyzed in ImageJ using the OrientationJ plugin. Evaluation within OrientationJ is based on the gradient structure tensor in an area within the region of interest. The coherence of each sample was determined and used as a measure of alignment for the sample.

Coherence values range from 0 to 1 and indicate orientation of image features, with 1 being anisotropic and 0 being entirely unaligned. For samples including immunofluorescence staining for cell and fiber co-alignment analysis, a Sobel-based orientation analysis was used for actin and collagen fiber alignment analysis, and the moment of inertia was used to determine the orientation of the nuclei. All values were binned at 10° from 0 to 180°, and summed bin values were normalized to the average value for that variable.

Example 1.6. Immunofluorescence Imaging

After 7 days of incubation, the gels were rinsed with PBS in their molds and then fixed in 3.7% formaldehyde in PBS for 1 h. The gels were rinsed once with PBS for 5 min and then transferred to a 24 well plate. Each well was rinsed with PBS 2 more times for 5 min each. The gels were then rinsed with 0.1% triton X-100 (Sigma-Aldrich 93443-100 ML) in PBS 2 times for 7 min. The gels were then incubated at room temperature with 1% bovine serum albumin (BSA, Sigma-Aldrich A7906-50G) in PBS for 1 h.

The gels were then allowed to sit overnight at 4° C. with the primary antibody solution diluted in 1% BSA. The gels were then rinsed 3 times with 0.1% Tween 20 (Sigma-Aldrich P9416-100 ML) in PBS for 5 min. Gels were then protected from light and incubated for 1 h at room temperature with a secondary antibody solution in 1% BSA. The gels were then rinsed twice for 5 min with 0.1% Tween 20 and once with PBS before being stored in fresh PBS. Antibodies were purchased from Thermo Fisher unless otherwise stated, and their dilutions are listed as follows: DAPI (1:2500, D1306), Phalloidin 546 (1:500, A22283), Phalloidin 488 (1:500, A12379), anti-rabbit Laminin (1:200, PA1-16730), anti-mouse Fibronectin (1:200, MA5-11981), anti-mouse Yes-associated Protein (1:500, Santa Cruz Biotechnology, sc-101199), anti-mouse Neurofilament (1:500, Developmental Studies Hybridoma Bank, RT97), Alexa Fluor goat anti-mouse 488 (1:500, A11029), Alexa Fluor 488 goat anti-rabbit (1:500, A11008), Alexa Fluor goat anti-mouse 568 (1:500, A11031), Alexa Fluor goat anti-rabbit 568 (1:500, A11011), Alexa Fluor goat anti-mouse 647 (1:500, A21235), and Alexa Fluor goat anti-rabbit 647 (1:500, A21244).

DAPI was used to show the presence of cells while also showing differences in cell density. Phalloidin, staining actin fibers, provides an insight into the alignment of ASCs in the stretched and non-stretched gels. Neurofilament stains DRG neurites for direction and length analysis. Laminin and fibronectin antibodies were used to show the ECM deposition and alignment of cell-laden gels. Fluorescence imaging was performed with an Olympus IX83 confocal microscope (20× objective magnification, NA 0.80) with a Z-step of 2 μm, starting from the 'top' surface and extending into the gel 250 slices or 500 μm.

Example 1.7. Live/Dead Assay

To determine cell viability in the scaffolds, 50 μL of Live/Dead solution (Fisher Scientific R37601) was added to each gel in the mold for 15 min. The gels were then suspended in clear Dulbecco's Modified Eagle Medium (DMEM, Fisher Scientific 12-800-017) until imaging. Each gel was removed from its mold and placed on a microscope slide for imaging with an Olympus IX83 confocal microscope (20× objective magnification, NA 0.80) with a Z-step of 5 μm, starting from the 'top' surface and extending into the gel 100 slices or 500 μm.

The percentage of live and dead cells was calculated with a custom MATLAB code quantifying the area occupied by live and dead cells. Analysis was performed on the compressed Z-stack at max intensity.

Example 1.8. Luminex

Serum-free ASC media were added to gels and collected after 24 h to analyze hASC secretome. The conditioned media were briefly spun to remove cell debris, followed by tenfold concentration using Amicon Ultra-4 Centrifugal Filter (3 kDa MWCO, Millipore Sigma UFC800396). Custom-designed 4-Plex Luminex kits (R&D Systems) were used to quantify beta-nerve growth factor (βNGF), neurotrophin-3 (NT-3), glial-derived neurotrophic factor (GDNF), and brain-derived neurotrophic factor (BDNF) as well as hepatocyte growth factor (HGF), basic fibroblast growth factor (FGF-2), angiopoietin-1 (Ang-1), and interleukin-8 (IL-8) levels in the conditioned media. Resulting values were normalized to double-stranded DNA (dsDNA) content. DNA concentration was determined using DNeasy Blood and Tissue Kit (Qiagen 69504) to isolate dsDNA and Quantifluor dsDNA System (Promega E2670) to quantify DNA content.

Example 1.9. YAP Staining Analysis

Quantitative analysis of immunofluorescence images stained against YAP was performed by creating a Z-stack of slices 10-30 in ImageJ with constant minimum and maximum values for both YAP and DAPI intensity. These images were exported to MATLAB for analysis with a custom code determining the intensity of staining in the nuclear and cytoplasmic regions of the cells.

Example 1.10. Mechanical Testing

Acellular and cellular 1 million (M) cell/mL, 3 mg/mL hydrogels were used for rheologic testing after 7 days of incubation. A Discovery Hybrid Rheometer (DHR-2) equipped with 25 mm compression plate (TA Instruments, New Castle, DE) was used to test the viscoelastic properties of collagen gels. A plate gap of 1 mm was set before the gels were compressed a total distance of 995 μm at a rate of 31.5 μm/s. Data was collected in Trios software provided by TA Instruments and exported to Excel for analysis. The Young's Moduli were determined from the linear portion of the graphs.

Example 1.11. DRG Harvest and Dissociation

All animal work was approved by the Institutional Animal Care and Use Committee (IACUC) of the University of Arkansas (protocol numbers 23019 and 20054). Male Sprague Dawley rats (3-4 weeks) weighing 35-49 g were purchased from Envigo and cared for by staff of the South Campus Animal Facility in accordance with the IACUC Standards and the Animal Welfare Act. Rats had access to 12-h light/dark cycles and standard food and water ad libitum. Rats were euthanized in ordinance with the American Veterinary Medical Association guidelines via carbon dioxide asphyxiation.

Immediately following euthanasia, the rat was transferred to a sterile hood and placed on an absorbent mat for dissection and DRG harvest. The rat was then sprayed with 70% ethanol, and electric clippers were used to shave the dorsal side of the animal. The skin was removed from the dorsal muscle and fascia with surgical scissors. Bone cutters were then used to sever the spinal column in the cervical and lumbar regions to isolate the spinal column by cutting on either side of the of the spine from the cervical to lumbar dislocations.

Following removal of the spinal column and trimming of any extra muscle, the spinal cord was removed via hydraulic extrusion with a 3 mL syringe and PBS. Surgical scissors were then used to cut through the dorsal and thoracic sides of the spinal column, allowing for the lateral halves to be separated. The DRGs were visualized and removed carefully with sterile forceps, cleaned and trimmed, and then collected in hibernate media (Thermo Fisher, A1247501) on ice until use.

Dissociation and coculture of the DRGs are adapted from a previously established method. First, the DRGs were collected in a microtube with 0.1% trypsin (Thermo Fisher, 15400054) and 1 mg/mL collagenase (Millipore Sigma, 10103578001) in PBS and allowed to incubate at 37° C. for 50 min, agitating the microtube every 10 min. The microtube was then centrifuged at 300 g for 5 min. The supernatant was subsequently removed and replaced with a suspension of 0.1% trypsin in PBS and allowed to incubate at 37° C. for 10 min. After incubation, neurobasal media supplemented with 1% Pen/Strep (Thermo Fisher, 15-140-122) and 2% B27 (Thermo Fisher, A3582801) were added to the microtube at a 3:1 ratio (media:PBS), and the microtube was centrifuged again.

The final supernatant was removed and replaced with fresh supplemented neurobasal media. The partially dissociated DRGs were resuspended in the solution and kept on ice until coculture.

Example 1.12. Neurite Outgrowth Model and Quantification by Coculture Methods

Acellular and cellular scaffolds were incubated for 7 days in ADSC media before neuron coculture. Immediately prior to seeding, media were removed from the hydrogels. A second sterile silicone isolator was placed atop the original, raising the outer wall of the mold. A 50 mL suspension of neuron media containing one intact DRG was then added to each individual hydrogel and contained within the added isolator. The DRGs were moved to the center of the hydrogel if needed. The DRGs were allowed to incubate without additional media for 12 h at 37° C. to assist in anchoring of the DRG to the scaffold.

After 12 h, 6 mL of supplemented neuron media were then added to the hydrogels, ensuring no DRGs are displaced in the process, and incubated for another 36 h at 37° C. until fixation and staining. Immunofluorescence staining of the hydrogel cocultures was performed with anti-neurofilament antibodies for neurite visualization and phalloidin for ASCs.

Overall orientation of DRG outgrowth was performed on a Z-stack of the entire Neurofilament channel in ImageJ with the Distribution tool in the OrientationJ plugin, which provides an orientation degree for each non-zero pixel. Histogram values were binned in 10-degree increments. Quantification of neurites was performed in FIJI using the Sholl analysis tool in the SNT plugin with a step size of 100 μm. The center of the DRG was used as the starting point, and neurites were quantified from 100 to 1400 μm.

Example 1.13. Statistical Analysis

Figure 3A:
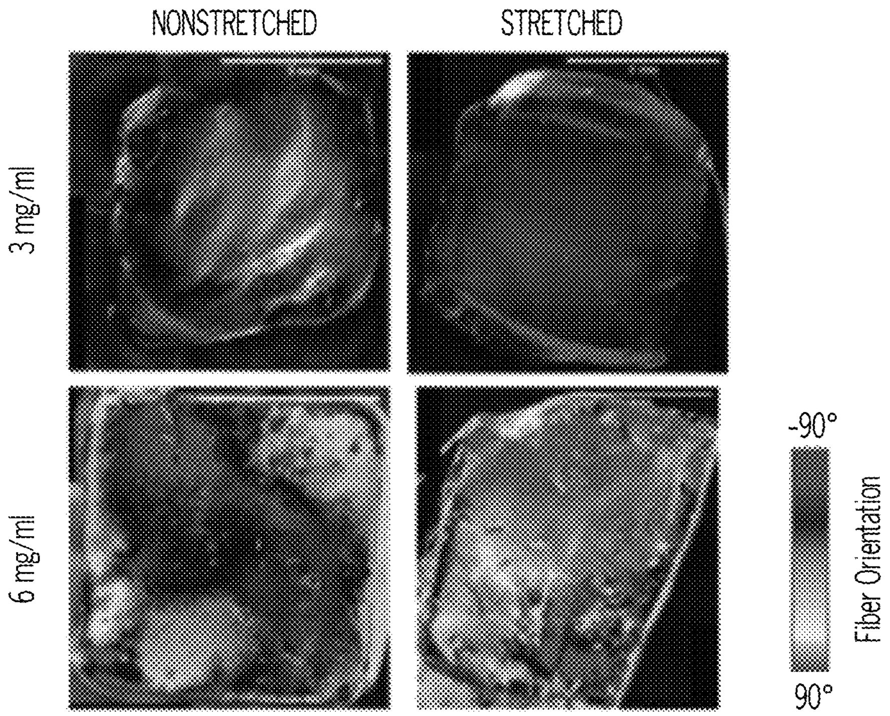
FIGS. 3A-3D provide experimental results related to fiber orientation in scaffolds.
Figure 3B:
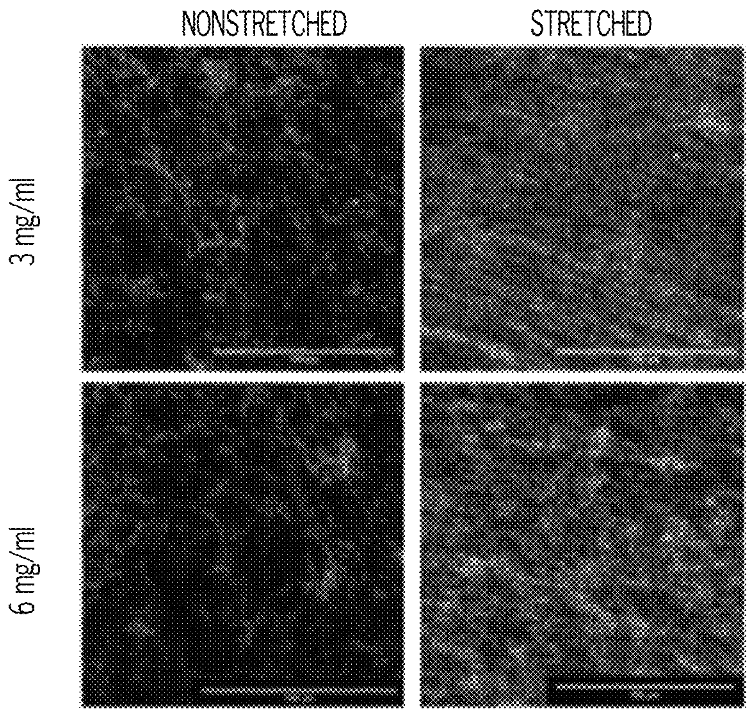
Figure 3C:
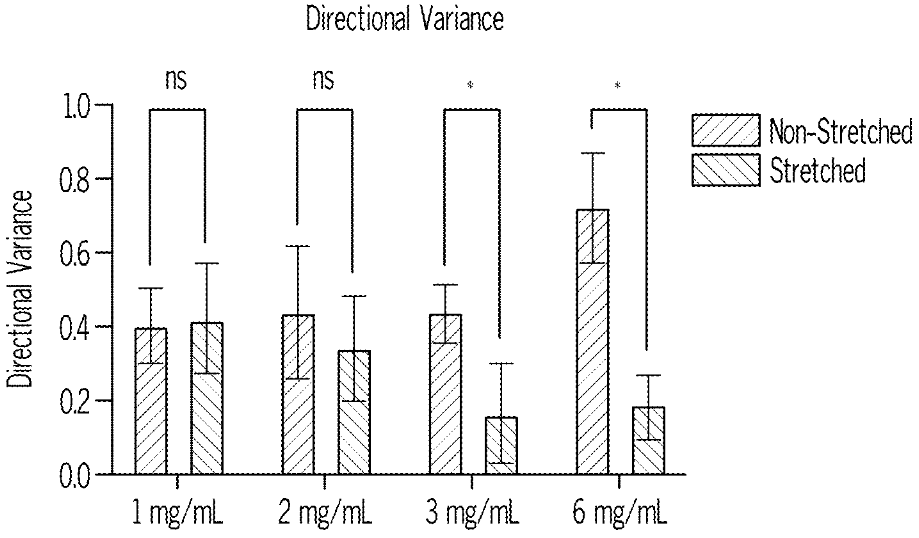

Statistical analysis was performed in GraphPad Prism 9.5.1 using unpaired t-tests, one-, two-, and three-way ANOVAs with Tukey's post-hoc analysis. Statistical significance was determined at $p<0.05$ Example 1.14. Fiber Alignment Analysis Applicant assessed collagen fiber alignment using QPLI and confocal reflectance. QPLI is a popular imaging method used to determine orientation of birefringent fibers within tissues and samples. To optimize the hydrogel composition for subsequent cell culture, QPLI was performed on stretched and non-stretched samples in collagen hydrogel concentrations of 1, 2, 3, and 6 mg/mL to examine the collagen fiber alignment (n=4 per group). The 1 and 2 mg/mL hydrogel samples failed to hold their shape and alignment after being released from the stretching device, and thus had no significant change in directional variance resulting from stretching. Directional variance measured with QPLI revealed significant decrease in variance (increase in alignment) after stretching in the 3 and 6 mg/mL samples (FIGS. 3A and 3C). Both 3 and 6 mg/mL samples maintained their shape and structure after being released from the stretching device.

Figure 3D:
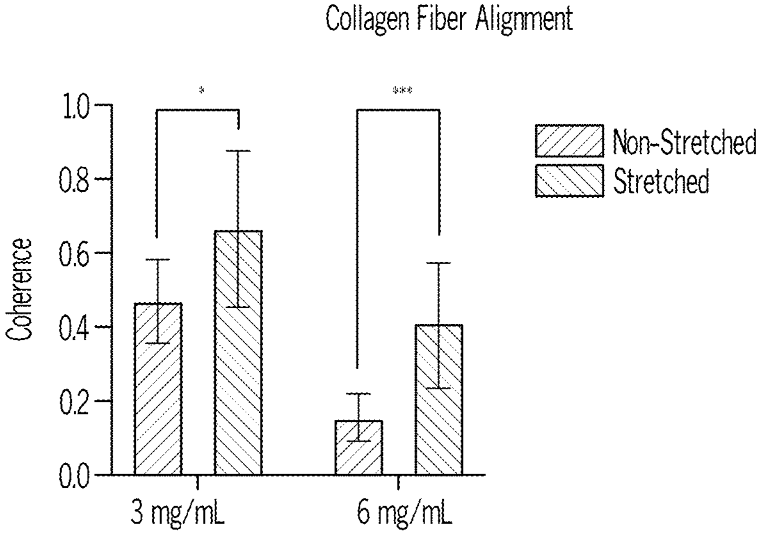

To support Applicant's findings from QPLI, Applicant performed confocal reflectance imaging on both stretched and non-stretched samples in 3 and 6 mg/mL concentrations to visualize individual collagen fiber organization and structure within the hydrogels. Imaging and analysis revealed significant increases in collagen fiber organization and alignment in both the 3 mg/mL and 6 mg/mL stretched samples compared to non-stretched controls (FIGS. 3B and 3D). Reflectance imaging of the collagen fibers resulted in organization that can be visualized at a macro-scale but is composed of many disconnected pixels that make analysis with pixel-based tools challenging. Due to this disconnection, the objective values for coherence of all reflectance samples, while indicating increased alignment, were lower than those seen in full fiber (actin) analysis. Similar results indicating an increase in alignment were seen with Sobel and Fourier analyses performed in MATLAB.

Through QPLI and confocal reflectance imaging, Applicant hereby demonstrates a significant increase in fiber alignment with the use of Applicant's stretching device. This result aligns with other studies achieving hydrogel fiber alignment through the usage of uniaxial stretch and compression. Many of these studies utilize a one-piece, flexible PDMS mold that can be pre-stretched or pre-compressed, for the hydrogel to then be cast in and relaxed from. Unlike many of these studies, Applicant has employed a two-part mold, comprising a silicone isolator and silicone sheet backer. This allows for easier removal of the hydrogels and their usage as a scaffold, as opposed to only an in vitro testbed.

Example 1.15. Cell Alignment

Figure 4A:
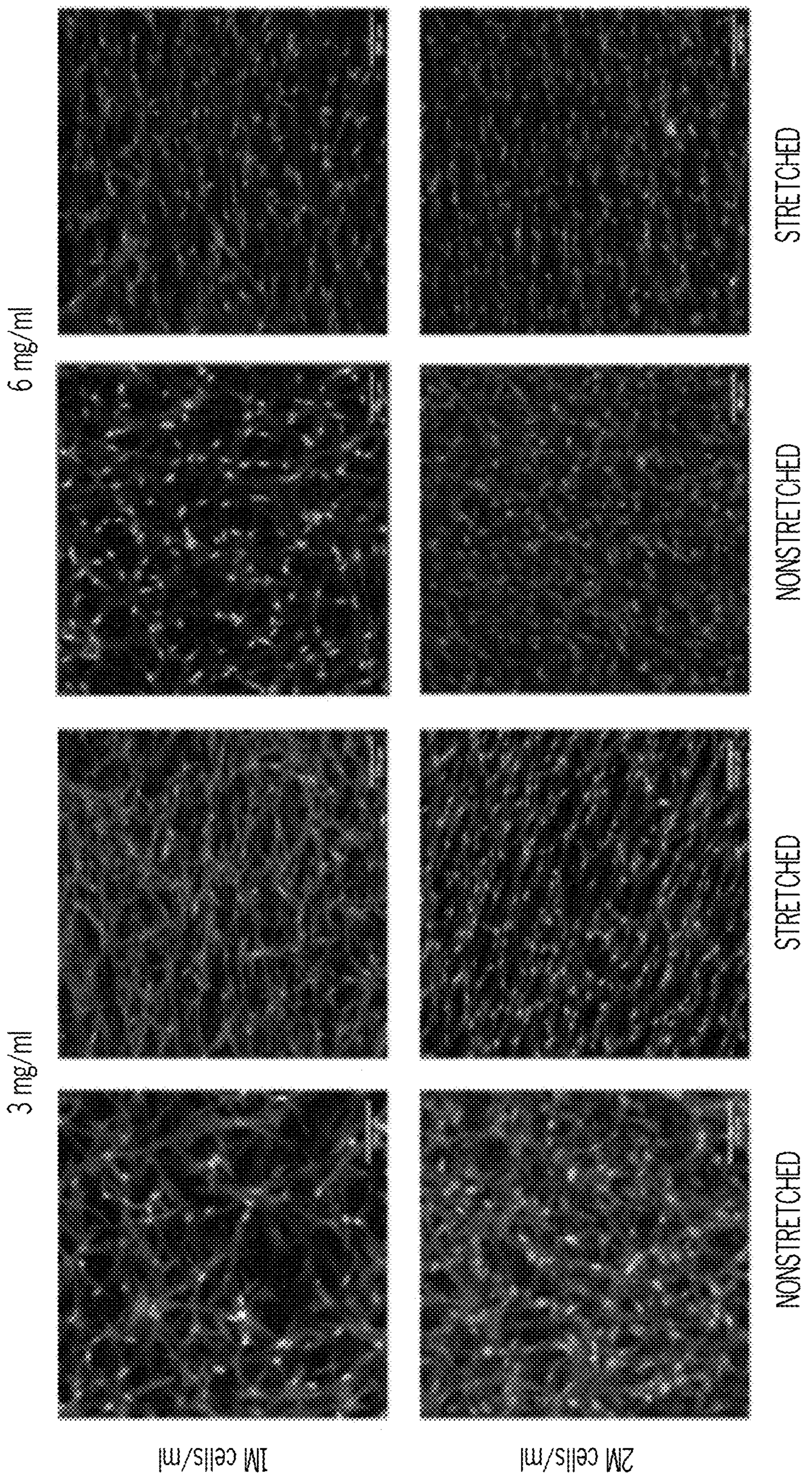
FIGS. 4A-4D provide data related to stretched and unstretched hydrogels.
Figure 4B:
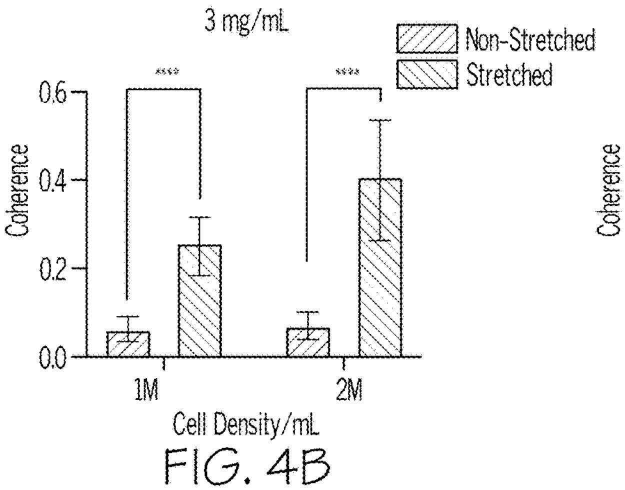
Figure 4C:
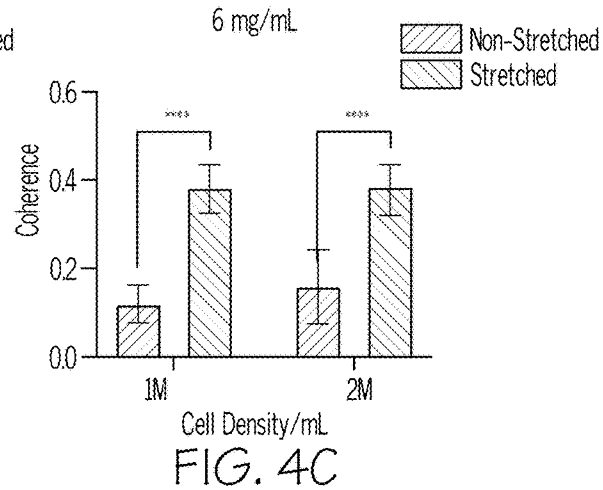
Figure 4D:
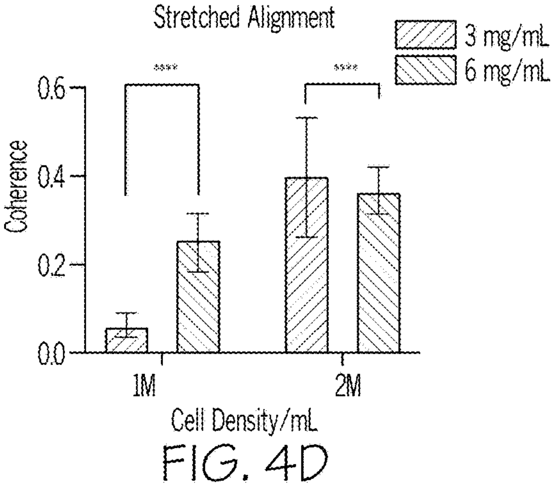

After 7 days of incubation, 3 and 6 mg/mL hydrogels were stained with phalloidin to assess cell alignment within the hydrogels (FIG. 4A). Image analysis revealed a significant increase in alignment in the stretched samples compared to the control in all cell densities and collagen concentrations tested (FIGS. 4B-4C). There was an increase in cell alignment in the 6 mg/mL 1 M samples compared to the same density in 3 mg/mL, but Applicant did not see any significant difference in the 2 M samples (FIG. 4D).

To confirm that cell alignment was coherent with collagen fiber alignment, Applicant performed confocal reflectance imaging along with immunofluorescence to visualize cells and fibers together. Upon qualitative visualization of these results, Applicant determined that cells were aligned uniformly along the direction of collagen fibers. Quantitative analysis in MATLAB shows co-localization of actin, collagen, and nuclei in the stretched 3 and 6 mg/mL samples that is not seen in either non-stretched group, indicated by the peak of both stretched group histograms around 90°. This result is also in agreement with previous studies that have found co-alignment of encapsulated cells with scaffold fibers. Not only can fiber alignment affect cell behavior and alignment, but this organization can provide structural guidance for outgrowing nerves to follow.

Example 1.16. Cell Viability

Figure 5A:
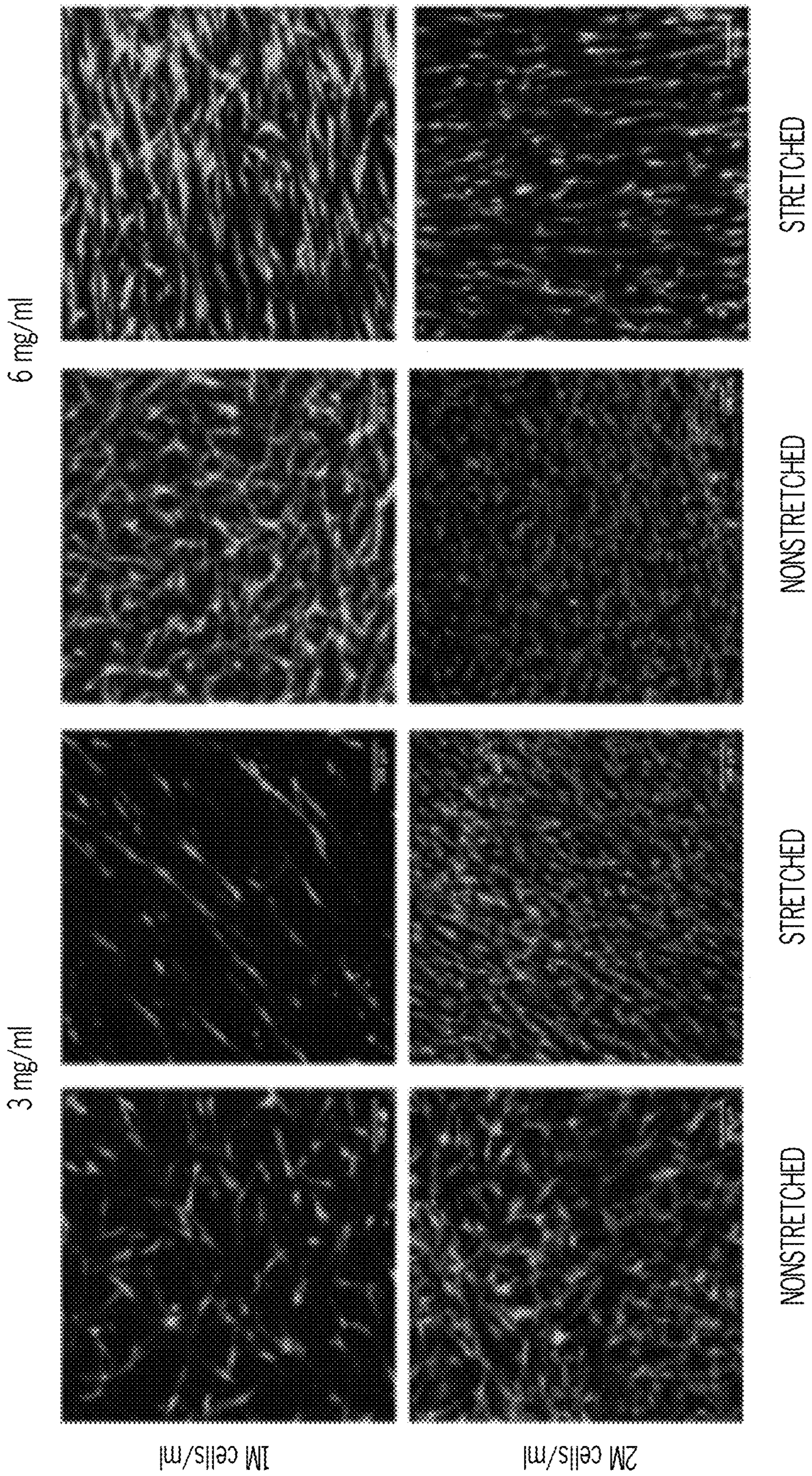
FIGS. 5A-5E provide data related to stretched and unstretched scaffolds.
Figure 5B:
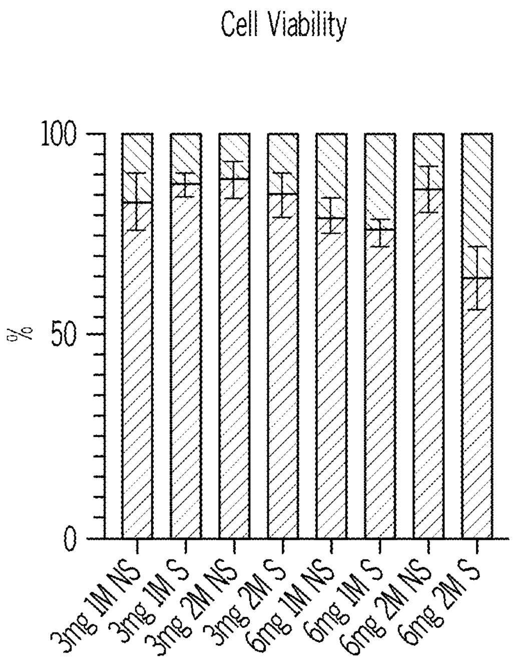
Figure 5C:
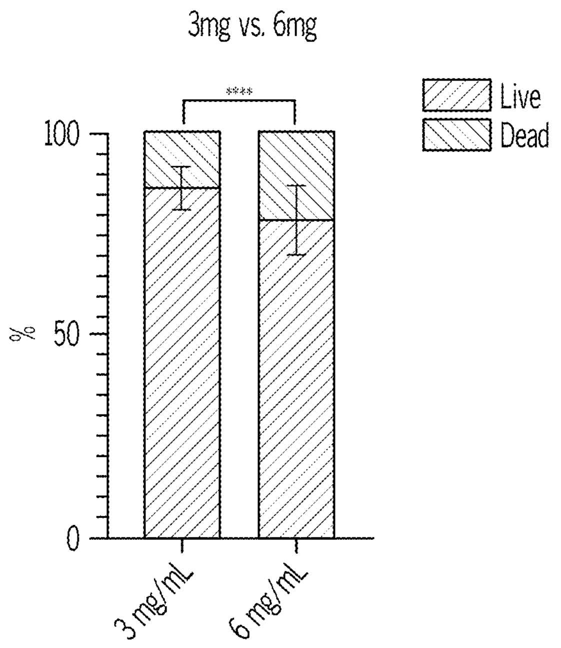
Figure 5D:
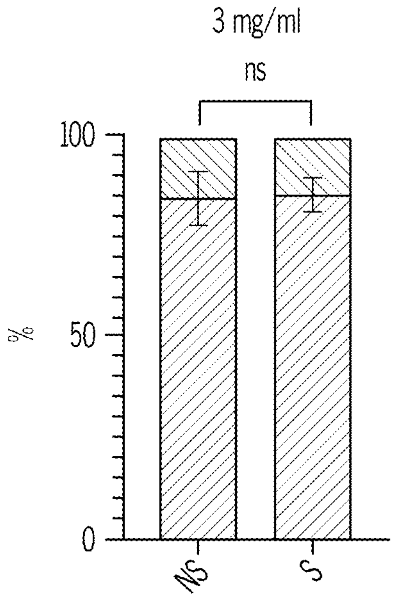
Figure 5E:
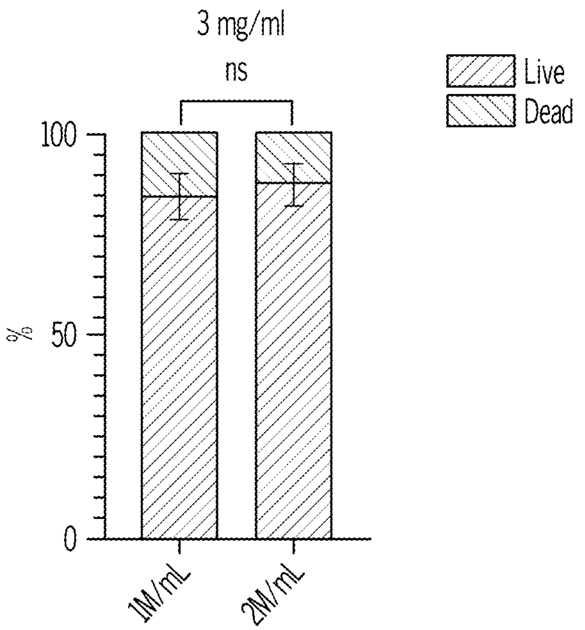
Figure 6E:
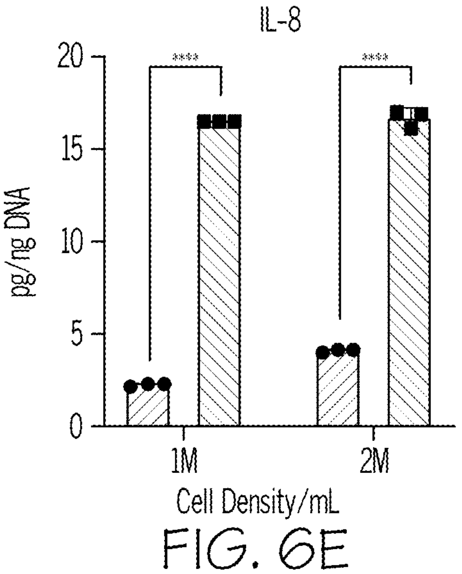
Figure 6F:
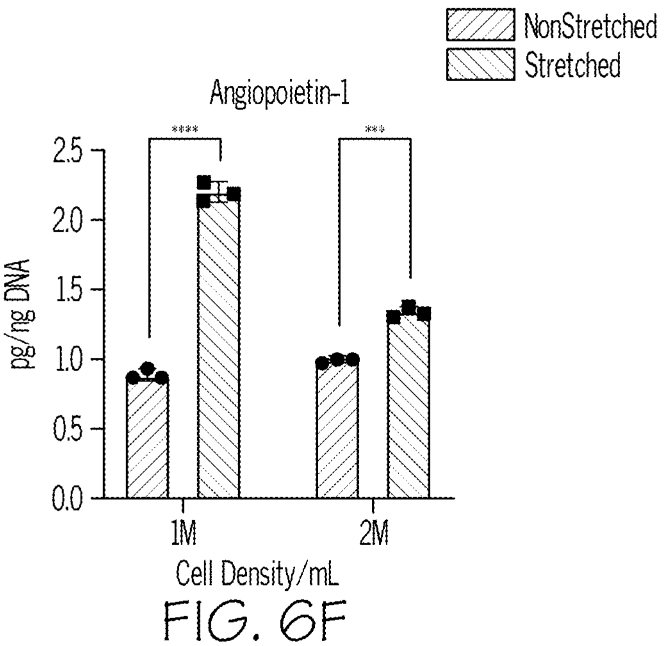
Figure 6G:
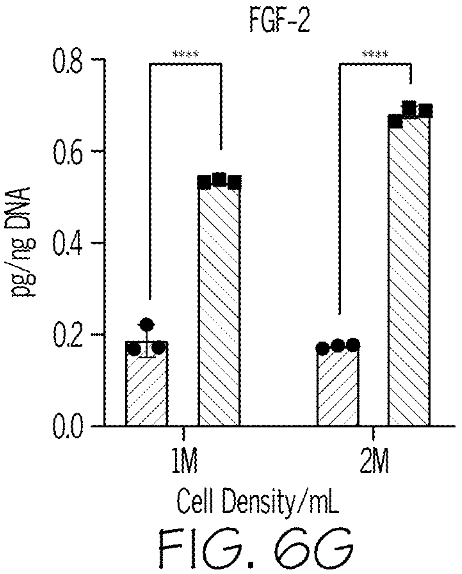

After demonstration of collagen fiber alignment within the hydrogels, hASCs were added to the pregel before thermal gelation to allow for alignment of the embedded cells. To assess cell viability within the hydrogels, a live/dead assay was performed after 7 days of culture (FIG. 5A). The assay revealed a significantly higher cell viability in the 3 mg/mL hydrogels compared to the 6 mg/mL samples (FIG. 5C). Within each group, there was no difference in viability relating to cell density or stretched vs. control samples (FIGS. 5D-5E). This is in agreement with published literature, with studies investigating the effects of both cell density and substrate alignment seeing no influence on viability from either factor. Accordingly, while fiber alignment may influence cell morphology and behavior, it does not positively or negatively influence cell survival. Therefore, since cell viability is significantly less in 6 mg/mL samples, 3 mg/mL gels were chosen for further analysis.

Example 1.16. ECM Deposition and Cell Secretome

Conditioned media collected from 7-day hydrogel culture after 24 h were analyzed with custom 4-plex Luminex kits (neurotrophic—NT-3, βNGF, GDNF, and BDNF; angiogenic—HGF, FGF-2, Ang-1, and IL-8) for hASC secretome in 3 mg/mL hydrogels with 1 and 2 M/mL cell densities. NT-3 was excluded due to absence of expression in Luminex results. The 1 M/mL hydrogels showed significant increase in all analytes in the stretched samples compared to non-stretched for both neurotrophic and angiogenic factors (FIGS. 6A-6G). The 2 M/mL samples showed an increase in all angiogenic analytes as well as BDNF and GDNF in the stretched samples compared to the control (FIGS. 6A-6G). Growth factors have been proven to be vital for translatable success with implantable peripheral nerve repair scaffolds. Several studies have investigated the secretome response to cell culture in aligned substrates, and many saw increases in various immunomodulatory and angiogenic factors in bMSCs and ASCs.

Neurotrophic factors, such as those mentioned above, have been proven to increase neurite outgrowth and functional outcomes in peripheral nerve repair applications, but no studies have investigated the influence of fiber alignment on bMSC or ASC neurotrophic secretome. As previously mentioned, both fiber alignment and embedded cells may influence neuro-directed stem cell differentiation, which may be positively influencing cell secretome. In peripheral nerve repair, BDNF, GDNF, and NGF are well documented in literature and act to encourage proliferation, survival, and expression of peripheral neurons.

In addition to the benefits provided by the neurotrophic factors, the secreted angiogenic factors benefit peripheral nerve repair. Basic fibroblast growth factor (FGF-2) has been well documented in wound repair and vascularization, but supplementation of FGF-2 also has been proven to increase functional and morphologic outcomes such as myelination and Schwann cell proliferation after peripheral nerve injury.

While IL-8 is associated with both anti- and pro-inflammatory mechanisms and occasionally linked to pain at the injury site, studies have shown that increased IL-8 helps to recruit immune cells vital in wound healing and acts as an angiogenic factor encouraging vascularization, and the presence of which may be indicative of ASC to Schwann cell differentiation. In another study, inclusion of Ang-1 was able to establish vascularization early in peripheral nerve repair and is one of the two main factors in vascularization (VEGF being the other). HGF has been shown in additional studies to be vital in myelination thickness and axonal regrowth. It also promotes the proliferation and migration of Schwann cells and increases expression of endogenous GDNF.

Encapsulation of cells stands as an attractive alternative to direct growth factor inclusion in scaffolds or local injection. Previously, growth factors have been administered at the site of injury with some success. However, those factors are typically exhausted or not retained at the site of injury. A construct with encapsulated growth factors can ensure localization to the site of injury, but the growth factors will still be exhausted over time. In cellular scaffolds, the embedded cells will continue to produce growth factors as long as cell viability is maintained. Another advantage of encapsulating cells directly, compared to growth factor encapsulation, is that multiple physiologically relevant growth factors can be incorporated with more ease than in acellular scaffolds. Furthermore, stem cells like ASCs have the potential to differentiate into tissue-like cells supporting native tissue regeneration and natural secretome deposition during scaffold degradation. Results indicate a significant increase of all analytes, both angiogenic and neurotrophic in the stretched 1 M/mL samples compared to only an increase in the angiogenic factors plus BDNF and GDNF in the stretched 2 M/mL gels. Because of less analyte upregulation in the 2 M/mL sample group, Applicant selected the 1 M/mL sample group for further characterization and experiments.

Example 1.17. ECM Deposition

After 7 days of incubation, 3 mg/mL hydrogels in 1 and 2 M/mL cell densities were stained with antibodies against fibronectin and laminin (FIGS. 7A-7E). Fibronectin and laminin were chosen given their demonstrated roles in promoting nerve repair.

Figure 7A:
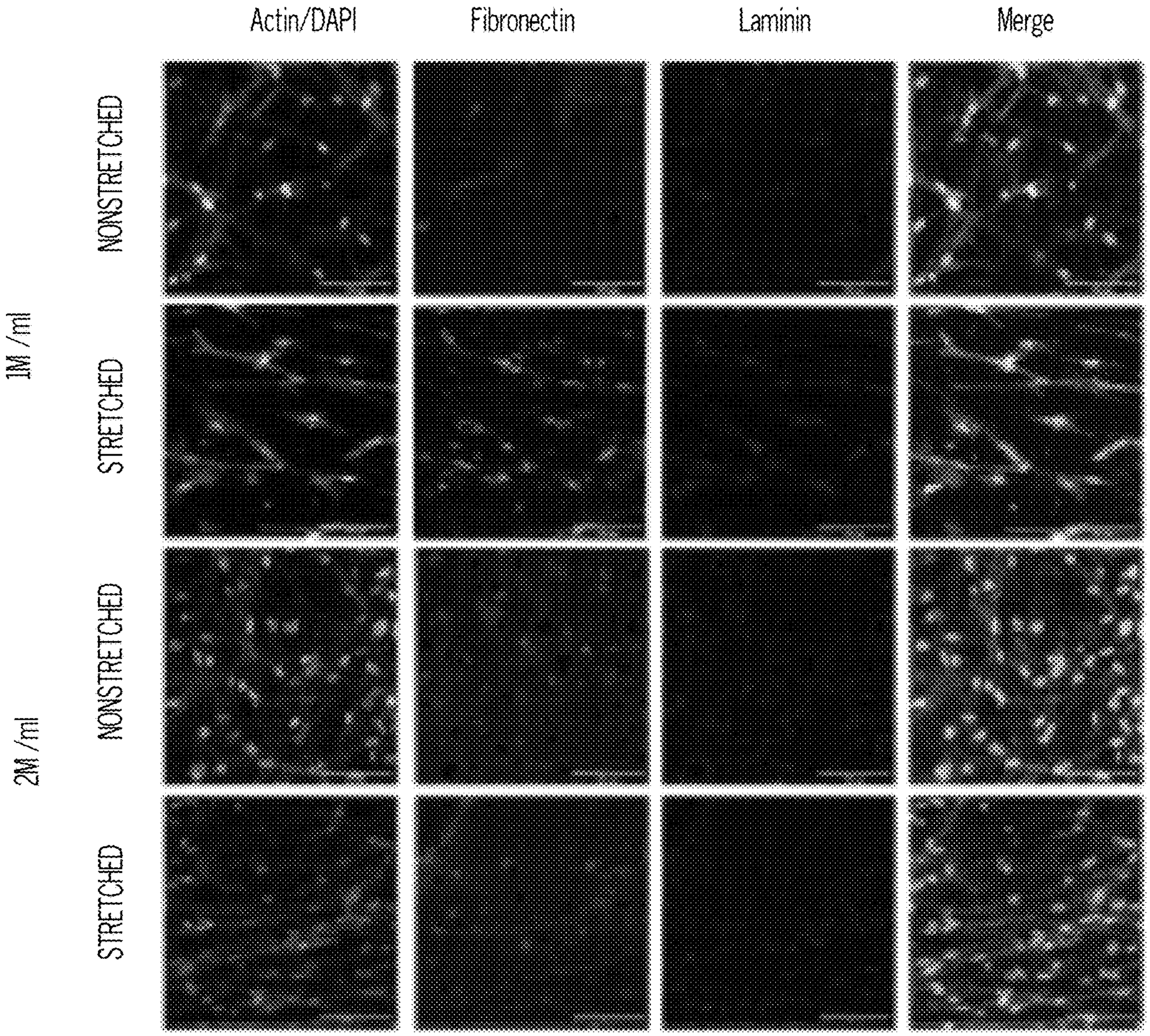
FIGS. 7A-7E show the presence of f-actin (red), fibronectin (green), laminin (blue), and DAPI (cyan) in 3 mg/mL scaffolds.
Figure 7B:
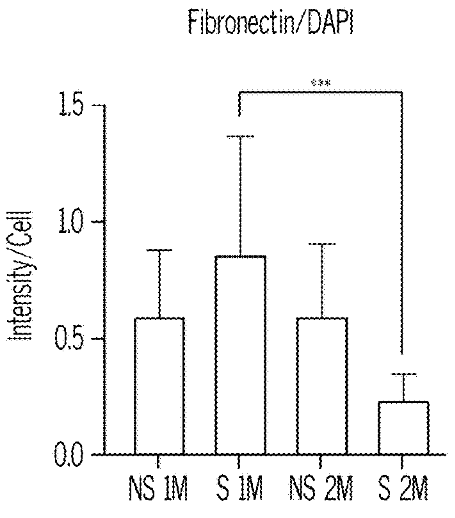
Figure 7C:
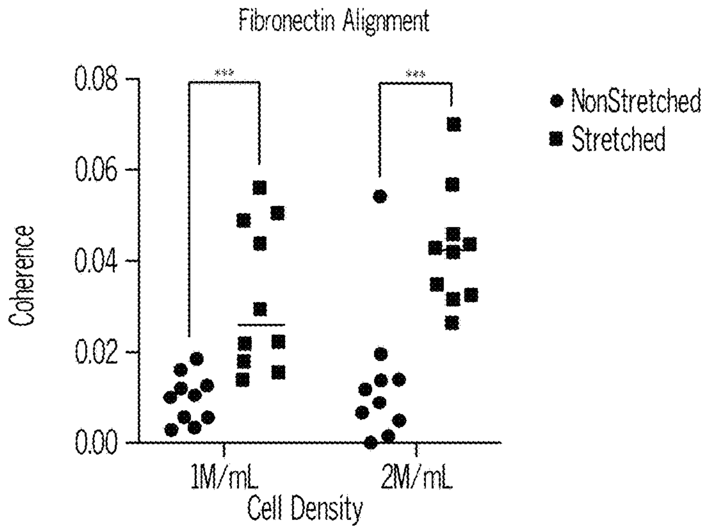
Figure 7D:
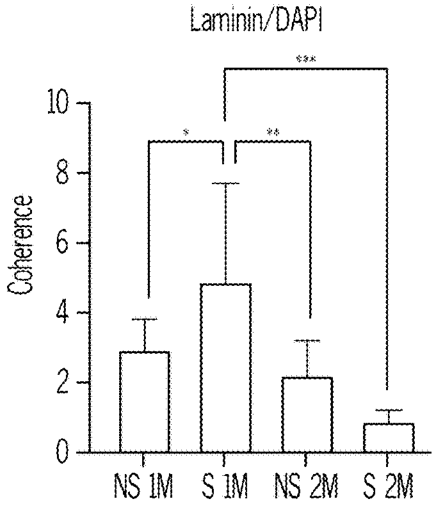
Figure 7E:
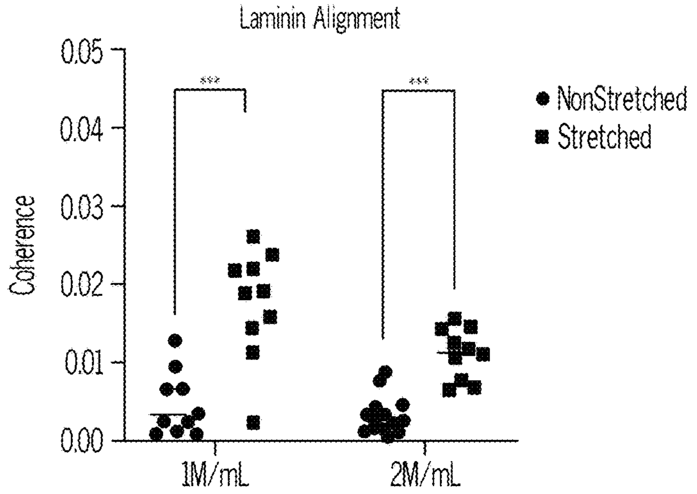

Fibronectin plays a critical role in cell adhesion, migration, and proliferation, while laminin is a major component of the basement membrane and has been shown to play a crucial role in neural development and myelination. In addition, both fibronectin and laminin are known to influence maturation and function of Schwann cells. Imaging and orientation analysis revealed a significant increase in alignment of both laminin and fibronectin in the stretched samples for both densities (FIGS. 7C and 7E). Intensity analysis normalized to cell count showed the stretched 1 M/mL sample had the greatest deposition of laminin compared to all other samples (FIG. 7D). The stretched 1 M/mL sample also showed the most deposition of fibronectin, while only significant against the stretched 2 M/mL group (FIG. 7B).

While many studies have investigated benefits of included fibronectin and laminin in peripheral nerve constructs with success, their deposition by ASCs in response to substrate alignment has not been thoroughly explored. Additionally, fibronectin expression increases during the early stages of Schwann cell differentiation and is required for the development of myelin-forming Schwann cells. Furthermore, laminin expression is upregulated during Schwann cell differentiation and is required for the proper alignment and spacing of Schwann cells during myelin formation. Laminin also plays a role in regulating the expression of myelin genes in Schwann cells, which are necessary for the formation and maintenance of myelin sheaths.

Interestingly, ASCs possess the ability to differentiate into "Schwann-like" cells and may be doing so in response to cell and fiber alignment within the grafts. Spontaneous Schwannogenic differentiation of MSCs cultured in aligned substrates has been documented, and while Applicant has not stained against any Schwann cell markers in this study, ASC behavior suggests this as a possible explanation.

Example 1.18. Potential Mechanism (YAP)

To elucidate the mechanism driving ASCs' increased ECM deposition and elevated expression of both neurotrophic and angiogenic secretome in stretched gels, Applicant stained against Yes-associated Protein (YAP). The YAP and TAZ (Transcriptional co-activator with PDZ-binding motif) pathway is a signaling pathway involved in regulating cell growth, proliferation, and differentiation.

Applicant hypothesized that the YAP/TAZ pathway activation was responsible for the elevated secretome in the stretched samples, as this pathway has been indicated in similar studies evaluating cell secretome response to stiffness and mechanical stimuli.

YAP and TAZ are transcriptional co-activators that are downstream effectors of the Hippo pathway, which is a signaling pathway involved in tissue homeostasis. In the absence of YAP/TAZ activation, they are phosphorylated by the Hippo pathway kinases and sequestered in the cytoplasm, leading to their degradation. Mechanical cues, such as substrate stiffness or fiber alignment, can activate the YAP/TAZ pathway and regulate its downstream effects. Specifically, when cells are subjected to mechanical forces that stretch or deform them, the resulting changes in cytoskeletal tension can lead to the activation and nuclear translocation of YAP/TAZ. The YAP/TAZ pathway has been implicated in elevated angiogenic secretome of MSCs and ASCs through mechano transduction of both substrate stiffness and fiber alignment.

Figure 8A:
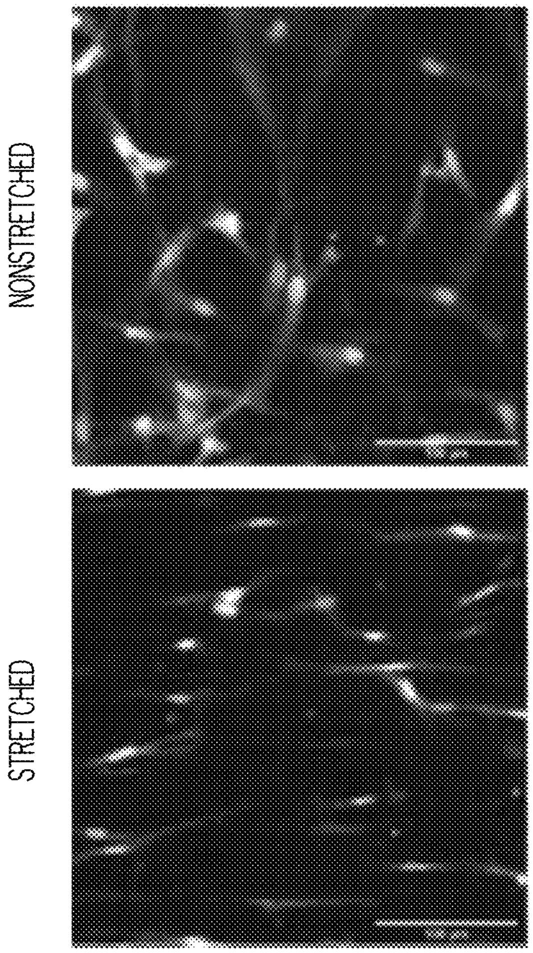
FIGS. 8A-8C show nuclear intensity and YAP ratio of 3 mg/ml scaffolds.
Figure 8B:
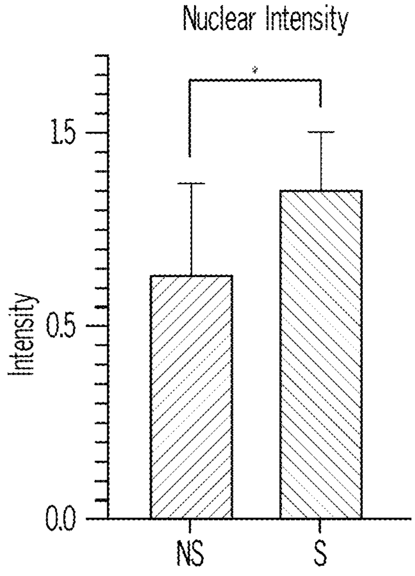
Figure 8C:
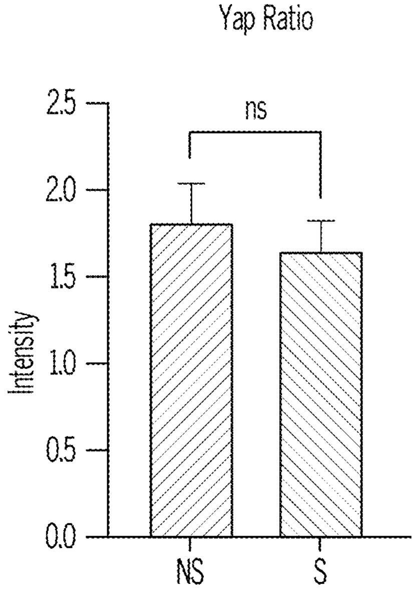

After staining against YAP, Applicant saw a significant increase in YAP intensity in the stretched samples (FIGS. 8A-8B). When Applicant calculated the nuclear to cytoplasmic intensity ratio, however, Applicant found that the non-stretched samples had a higher ratio with more proportional nuclear staining than the stretched group, which is usually found elevated when the pathway is triggered (FIG. 8C). Nuclear staining was evident in both non-stretched and stretched samples.

Example 1.19. Mechanical Testing

The stiffness of a hydrogel graft can not only influence embedded cell behavior, but native tissue behavior as well. Spontaneously self-assembled collagen fibrils tend to show poor mechanical strength under physiological conditions. These poor mechanical properties require crosslinking approaches to enhance the mechanical properties of collagen gels.

Figure 9A:
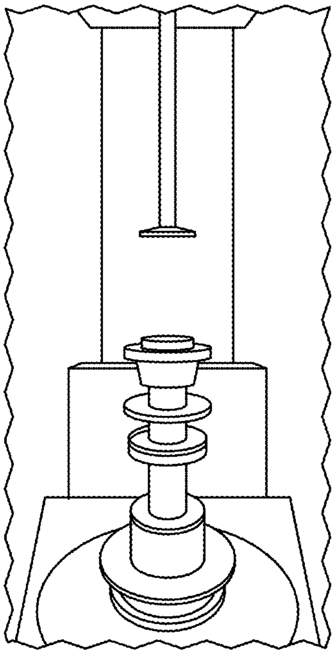
FIGS. 9A-9C provide compression test results of 3 mg/ml scaffolds.
Figure 9B:
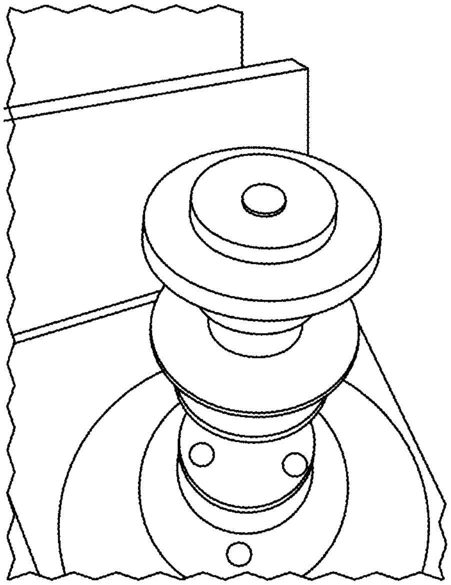
Figure 9C:
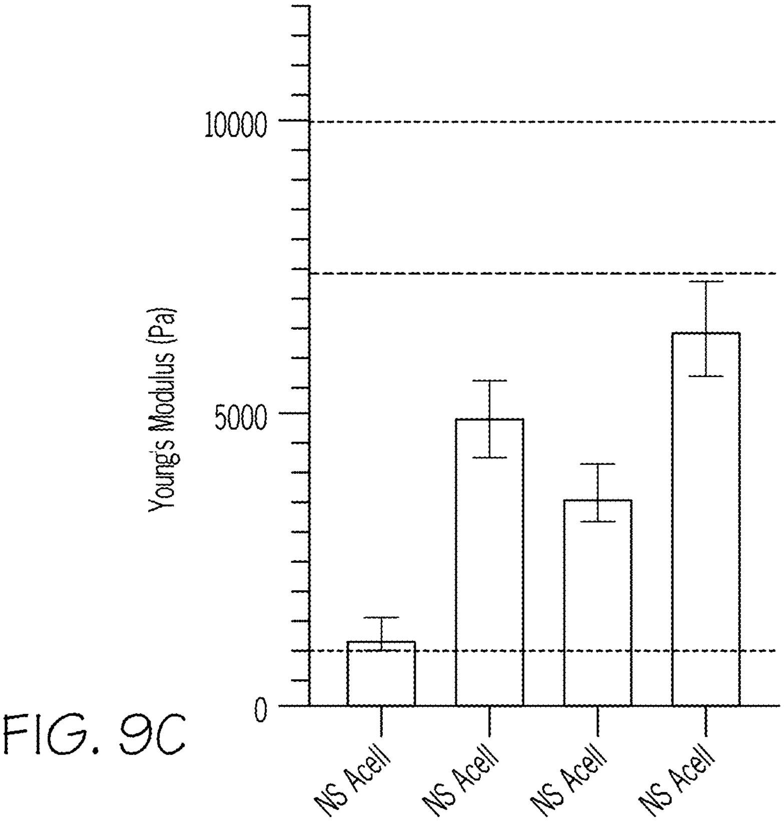

However, Applicant's gels do not utilize additional crosslinking techniques to improve mechanical properties. The native self-assembled collagen gels show mechanical properties proven to support neural cell growth. The self-assembled gels should show one of the following mechanical characteristics to support neuro-regenerative behavior. Low substrate stiffnesses (100-500 Pa) greatly favors neurons. Higher substrate stiffnesses (1-10 kPa) influence cell differentiation and increase Schwann cell motility and proliferation. Highest stiffnesses (>10 kPa) have been shown to be beneficial for axon guidance in peripheral nerve repair grafts. Testing revealed Young's moduli of all samples within the 1-10 kPa range, previously proven ideal for Schwann cell migration (FIGS. 9A-9C).

Further, the S 1 M/mL sample had a Young's modulus of 6.5±0.8 kPa, closest to a previously defined value of 7.45 kPa determined to be optimal for Schwann cell migration in a previously published study. Results show stretched 3 mg/mL with 1 M/mL cellular density provides reported optimal mechanical properties to support Schwann cell migration.

Example 1.20. Neurite Outgrowth In Vitro

Figure 10A:
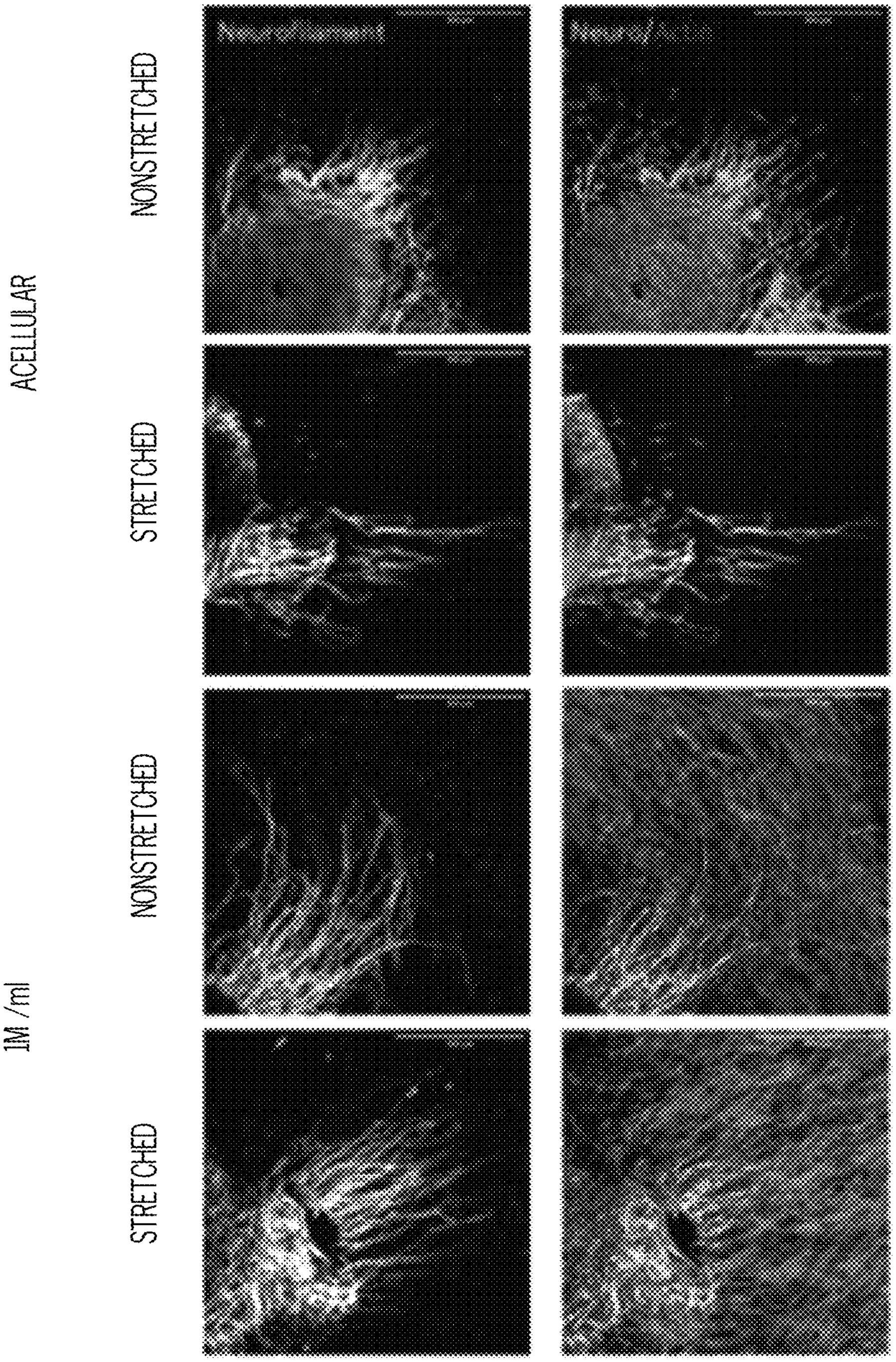
FIGS. 10A-10E provide data related to neurite outgrowth in 3 mg/ml scaffolds.
Figure 10B:
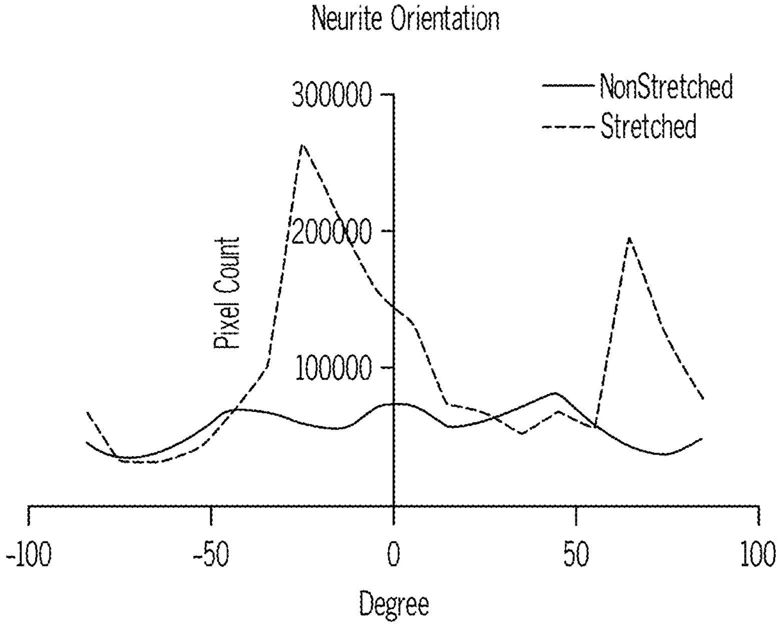

To assess neurite outgrowth in vitro, partially dissociated, whole DRGs were seeded onto acellular and 1 M/mL non-stretched and stretched constructs (FIG. 10A). This partial dissociation method, along with full dissociation and whole DRG culture, has been well documented in other studies. Several studies have included NGF or other growth factors in their neuronal media. Since Applicant wanted to investigate the effects of cell alignment and their increased cell secretome on neurite production and extension, this was omitted in the media. Orientation analysis of the outgrowing neurites revealed the highest concentration of neurite alignment in stretched samples around 0°, indicated by the peak (FIG. 10B). The same analysis of non-stretched samples revealed no peak or localization of fiber orientation, suggesting a random, unstructured organization of the neurites. The −10-degree peak in the stretched sample group suggests primarily horizontal orientation of outgrowing neurites, beneficial when trying to bridge a longer nerve gap. The smaller peak around 80. is perpendicular to the major orientation axis and represents the initial axon protrusion into the hydrogel. Often, axons growing into the hydrogel are unorganized close to the DRG, but as they grow farther from the source and into the aligned fiber network, they bend and eventually follow the orientation of cells and fibers.

Figure 10C:
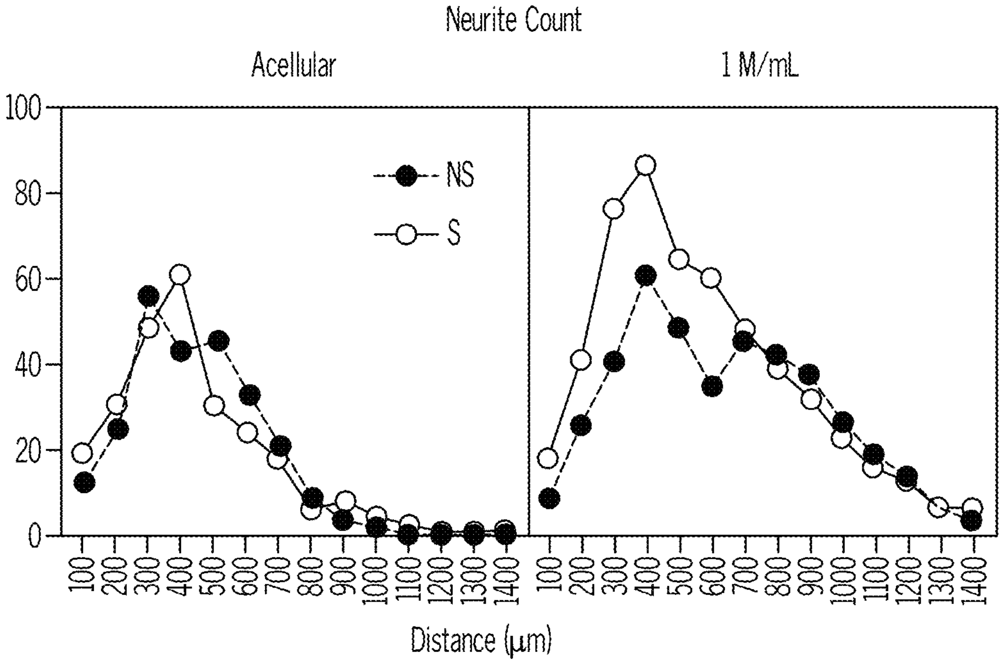
Figure 10D:
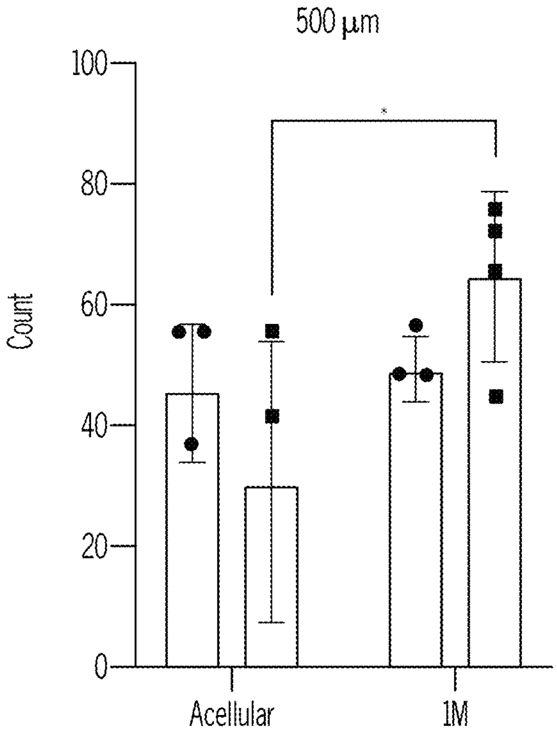
Figure 10E:
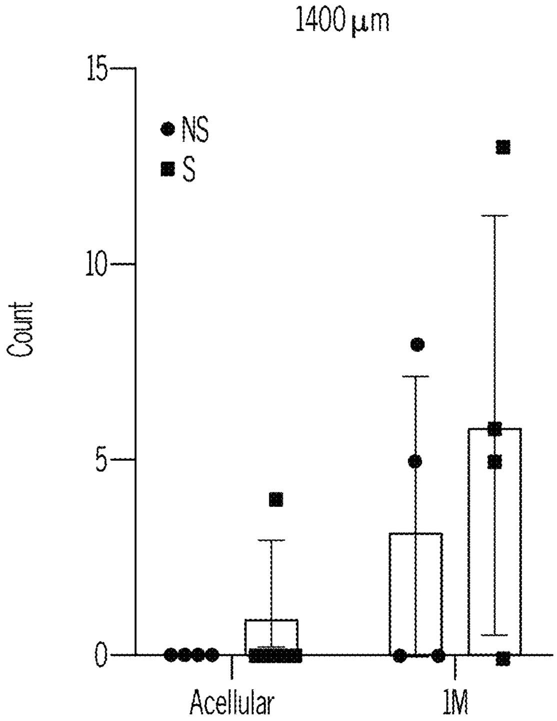

Neurite counts were performed with a Scholl analysis tool, providing a count of neurons reaching a distance; in this case, measurements were taken every 100 μm from 0 to 1400 μm. Sholl analyses function by creating concentric rings around a center point and measuring dendritic intersection with those rings. A count of neurites measured extending from the center of the DRG from 100 to 1400 μm shows the highest number of neurites reaching over both 500 and 1400 μm in the stretched 1 M/mL group (FIGS. 10C-10E). Only the count at 500 μm for the S 1 M against the S acellular sample proved to be significantly different, however this is not surprising with the small sample size (n=4/group). With increased sample size, Applicant expects the significance to improve. Three-way ANOVA revealed significant sources of variation from both cell density and stretch ($p<0.0001$ and $p=0.0391$ respectively) over all count distances, further supporting the argument for the stretched 1 M sample's advantage. Although the cellular samples did have more neurite outgrowth (quantity and length) than the acellular samples, the differences were only significant when comparing the entire outgrowth profile with ANOVA and not at each outgrowth distance.

While these data are promising, future studies should include a larger sample size and the neurite outgrowth evaluation at varying time points, as the cell presence may have greater influence on regeneration over longer periods of time. Further, the gold standard for DRG studies is harvesting from neonatal or newborn rats. This study was performed with DRGs from 3-week-old rats, which could contribute to limitations in neurite outgrowth, as DRGs become less proliferative as animals age. Additionally, the Sholl analysis is a radial assay, meaning all outgrowth from the center, not only in a certain direction is valued. If the distance was measured toward a specific endpoint along the axis of orientation (such as a nerve stump), Applicant would expect to see further outgrowth in the stretched samples. Nerve stumps secrete additional neurotrophic factors such as NGF, GDNF and BDNF.

Through the encapsulation of ASCs into aligned collagen fiber gels, which deposited growth factors associated with the nerve stump, neuro-regenerative properties increased the outgrowth of neurites. Neurite outgrowth results are in alignment with other studies proving the advantage of anisotropic scaffold construction for peripheral nerve repair.

Example 1.21. Conclusions

In this Example, Applicant demonstrated the fabrication and in vitro potential of aligned collagen I scaffolds for use in peripheral nerve repair. Utilizing a silicone-based mold and pre-stretching with an in-house device, Applicant showed significant and effective collagen fiber and cell alignment, increased neurotrophic and angiogenic secreted factors, and increased deposition and alignment of ECM components important for effective and directed nerve repair, possibly due to the mechanosensitive YAP/TAZ pathway.

Furthermore, Applicant's in vitro model of DRG neurite outgrowth provided evidence supporting increased axonal regeneration and directional guidance governed by fiber and cell orientation within the scaffolds. Based on the results, an ideal scaffold would be one consisting of a stretched 3 mg/mL gel with a cellular density of 1 M/mL.

The novelties of this Example include: 1) the development of a custom uniaxial stretching device that allows co-alignment of ECM fibers and encapsulated cells, 2) a broad characterization of neuro-regenerative behavior of non-neural ASCs in aligned collagen fiber hydrogels for a long period of time in culture, and 3) its direct effect on neurite outgrowth. This unique approach to the construction of the stretching device and accompanying molds allows for removal of the cell-laden, anisotropic hydrogel from the device after fabrication and its subsequent function as a nerve repair scaffold in vivo.

The application of fiber alignment coupled with encapsulated cells can be used for customized nerve scaffolds, further promoting native-like tissues in nerve scaffolds for patient specificity and personalized to the anatomy of the nerve gap or injury. Notably, encapsulating pro-regenerative cells such as ASCs in 3D ECM hydrogels can provide a long-term living depot of neuro-regenerative molecules.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

The invention claimed is:

1. A method of moving a mold, said method comprising:
clamping the mold between a first base and a second base of a clamp assembly,
wherein each of the first base and the second base comprises at least a first aperture and a second aperture within each of the first base and the second base, respectively, wherein each of the first aperture and second aperture is interfaced with the mold, and wherein each of the first aperture and second aperture comprises at least one peg within each of the first aperture and second aperture that is associated with the mold,
wherein the clamp assembly is operational to stretch and compress the clamped mold without movement of the first base, the second base, the first aperture, and the second aperture; and
moving the clamped mold,
wherein the moving comprises adjustment of the pegs within the first aperture and second aperture, and
wherein the moving occurs without moving the first base, the second base, the first aperture, and the second aperture.

2. The method of claim 1, wherein the moving comprises stretching the clamped mold without biaxial movement of the first base, the second base, the first aperture, and the second aperture.

3. The method of claim 1, wherein the moving comprises compressing the clamped mold without biaxial movement of the first base, the second base, the first aperture, and the second aperture.

4. The method of claim 1, wherein the moving comprises uniaxial movement of the clamped mold.

5. The method of claim 1, wherein each of the first base and the second base comprises a plurality of apertures within each of the first base and the second base, wherein each of the plurality of apertures is interfaced with the mold, wherein each of the plurality of apertures comprises at least one peg within the aperture that is associated with the mold, wherein the moving comprises adjustment of the pegs within the plurality of apertures, and wherein the moving occurs without moving the first base, the second base, and the plurality of apertures.

6. The method of claim 5, wherein the moving comprises differential adjustment of the pegs to provide different degrees of stretching, compressing, or combinations thereof.

7. The method of claim 1, wherein the method comprises:
stretching the clamped mold;
placing a precursor solution on the clamped and stretched mold;
curing the precursor solution on the clamped and stretched mold; and
compressing the clamped mold after the curing.

8. The method of claim 7, wherein the curing comprises incubating the precursor solution with the clamped and stretched mold.

9. The method of claim 8, wherein the incubating occurs at a temperature below room temperature.

10. The method of claim 8, wherein the incubating occurs at about 4° C.

11. The method of claim 7, wherein the compressing comprises removing the clamped and stretched mold from the first base and the second base.

12. The method of claim 7, wherein the precursor solution comprises an extracellular matrix precursor solution.

13. The method of claim 7, wherein the precursor solution further comprises cells.

14. The method of claim 7, wherein the method is used to form aligned extracellular matrix fibers on the mold.

15. A clamp assembly comprising:

a first base and a second base, wherein each of the first base and the second base comprises at least a first aperture and a second aperture within each of the first base and the second base, respectively, wherein each of the first aperture and second aperture comprises at least one peg within each of the first aperture and second aperture; and a mold, wherein the mold is operational to be clamped between the first base and the second base of the clamp assembly, interface with the first aperture and the second aperture, and associate with the pegs within the first aperture and the second aperture, and wherein the clamp assembly is operational to stretch and compress the clamped mold through adjustment of the pegs, and without movement of the first base, the second base, the first aperture, and the second aperture.

16. The clamp assembly of claim 15, wherein the pegs are operational for stretching and compressing the mold through adjustment of the pegs.

17. The clamp assembly of claim 15, wherein each of the first base and the second base comprises a plurality of apertures within each of the first base and the second base, wherein each of the plurality of apertures is interfaced with the mold, wherein each of the plurality of apertures comprises at least one peg within the aperture that is associated with the mold, and wherein the pegs are operational for stretching and compressing the mold through adjustment of the pegs, and without movement of the plurality of apertures.

18. The clamp assembly of claim 17, wherein the pegs are operational for providing different degrees of stretching and compressing through the differential adjustment of the pegs.

19. The clamp assembly of claim 15, wherein the clamp assembly is operational to stretch and compress the clamped mold without biaxial movement of the first base, the second base, the first aperture, and the second aperture.

20. The clamp assembly of claim 15, wherein the mold comprises a hydrogel.

* * * * *